(12) United States Patent
Chemali et al.

(10) Patent No.: US 8,134,476 B2
(45) Date of Patent: *Mar. 13, 2012

(54) APPARATUS AND METHODS FOR SELF-POWERED COMMUNICATION AND SENSOR NETWORK

(75) Inventors: Roland E. Chemali, Houston, TX (US); Volker Krueger, Celle (DE); Peter Aronstam, Houston, TX (US); Roger Fincher, Conroe, TX (US); Larry Watkins, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 945 days.

This patent is subject to a terminal disclaimer.

(21) Appl. No.: 12/132,497

(22) Filed: Jun. 3, 2008

(65) Prior Publication Data

US 2008/0247273 A1  Oct. 9, 2008

Related U.S. Application Data

(63) Continuation of application No. 11/049,538, filed on Feb. 2, 2005, now Pat. No. 7,400,262, which is a continuation-in-part of application No. 10/867,304, filed on Jun. 14, 2004.

(60) Provisional application No. 60/478,237, filed on Jun. 13, 2003, provisional application No. 60/491,567, filed on Jul. 31, 2003.

(51) Int. Cl.
*G01V 3/00* (2006.01)

(52) U.S. Cl. ............... 340/854.3; 340/854.4; 340/855; 367/82

(58) Field of Classification Search ............ 340/853.1, 340/854.3, 854.4; 367/81–84; 73/861.27
See application file for complete search history.

(56) References Cited

U.S. PATENT DOCUMENTS

| | | |
|---|---|---|
| 2,379,800 A | 7/1945 | Hare |
| 3,970,877 A | 7/1976 | Russell et al. |
| 4,095,865 A | 6/1978 | Denison et al. |
| 4,178,524 A | 12/1979 | Ritter |
| 4,276,943 A | 7/1981 | Holmes |
| 4,518,888 A | 5/1985 | Zabcik |
| 4,532,812 A | 8/1985 | Birchak |

(Continued)

FOREIGN PATENT DOCUMENTS

EP   0320135 A1   6/1989

(Continued)

OTHER PUBLICATIONS

Fraunhofer Magazine; 2.2000, Miniature Power Packs for Mobile Devices, 2000; pp. 6-11.

*Primary Examiner* — Timothy Edwards, Jr.
(74) *Attorney, Agent, or Firm* — Cantor Colburn LLP

(57) ABSTRACT

A system for communicating between a first location and a second location comprises a jointed tubular string having a first section and a second section connected at a connection joint, with the tubular string having a fluid in an internal passage thereof. A first acoustic transducer is mounted in the internal passage of the first section proximate the connection joint, and a second acoustic transducer is mounted in the internal passage of the second section proximate the connection joint. A signal transmitted from the first location to the second location is transmitted across the connection joint as an acoustic signal in the fluid from the first acoustic transducer to the second acoustic transducer.

20 Claims, 20 Drawing Sheets

U.S. PATENT DOCUMENTS

| | | | |
|---|---|---|---|
| 4,591,226 A | 5/1986 | Hargett et al. |
| 4,690,212 A | 9/1987 | Termohlen |
| 4,914,433 A | 4/1990 | Galle |
| 4,924,949 A | 5/1990 | Curlett |
| 5,184,678 A | 2/1993 | Pechkov et al. |
| 5,477,505 A | 12/1995 | Drumheller |
| 5,616,928 A | 4/1997 | Russell et al. |
| 5,839,508 A | 11/1998 | Tubel et al. |
| 6,272,916 B1 | 8/2001 | Taniguchi et al. |
| 6,384,738 B1 | 5/2002 | Carstensen et al. |
| 6,392,317 B1 | 5/2002 | Hall et al. |
| 6,424,079 B1 | 7/2002 | Carroll |
| 6,450,258 B2 | 9/2002 | Green et al. |
| 6,504,258 B2 | 1/2003 | Schultz et al. |
| 6,670,880 B1 | 12/2003 | Hall et al. |
| 6,768,214 B2 | 7/2004 | Schultz et al. |
| 7,400,262 B2 * | 7/2008 | Chemali et al. | 340/854.3 |
| 2002/0011335 A1 | 1/2002 | Zhang et al. |
| 2002/0034668 A1 | 3/2002 | Zhang et al. |
| 2002/0096887 A1 | 7/2002 | Schultz |
| 2003/0098181 A1 | 5/2003 | Aronstam et al. |
| 2003/0196816 A1 | 10/2003 | Aronstam |
| 2005/0207279 A1 | 9/2005 | Chemali et al. |

FOREIGN PATENT DOCUMENTS

| | | |
|---|---|---|
| EP | 0921269 A1 | 6/1999 |
| GB | 2377131 A | 12/2002 |

* cited by examiner

Sect. A-A

Sect. B-B

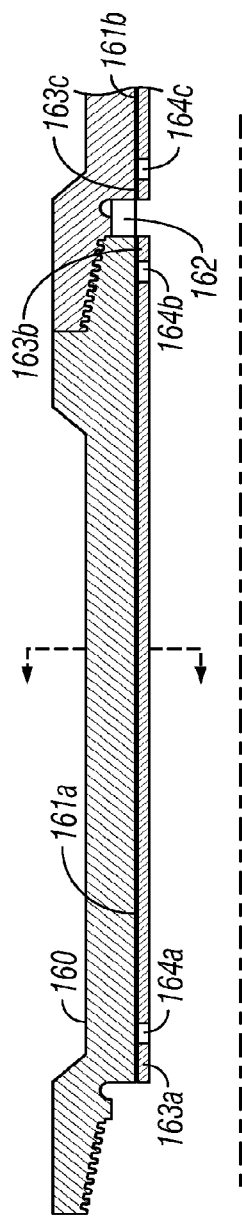
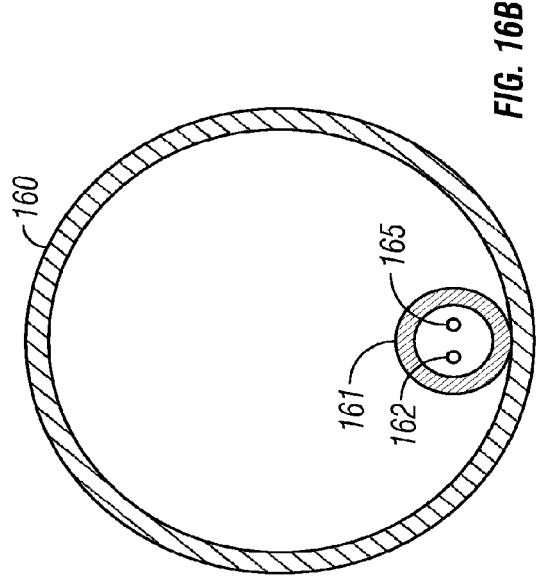
FIG. 16A
FIG. 16B

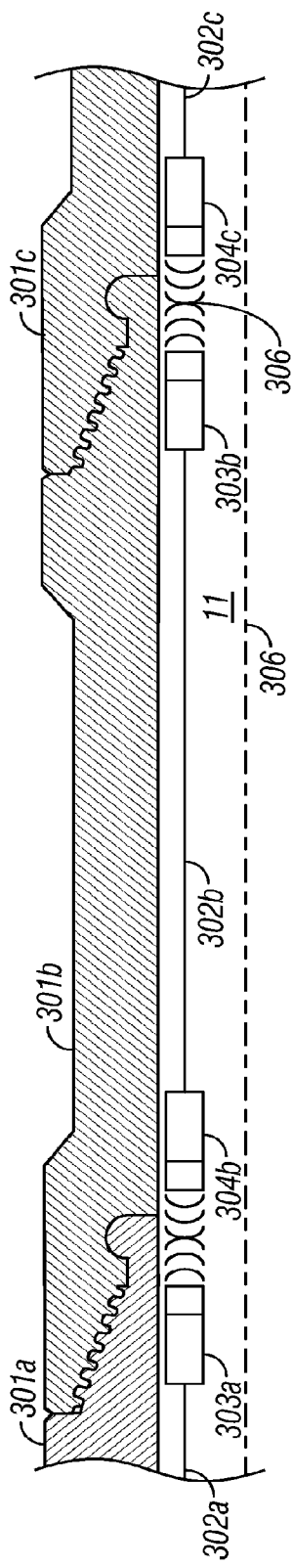
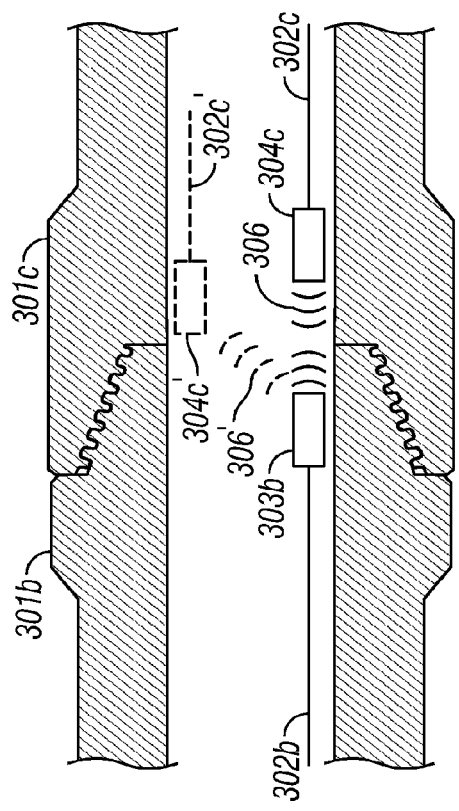
FIG. 25
FIG. 26

APPARATUS AND METHODS FOR SELF-POWERED COMMUNICATION AND SENSOR NETWORK

CROSS-REFERENCE TO RELATED APPLICATIONS

This application is a Continuation of U.S. patent application Ser. No. 11/049,538, filed on Feb. 2, 2005, which is a Continuation-In-Part of U.S. patent application Ser. No. 10/867,304, filed Jun. 14, 2004, which claims the benefit of U.S. Provisional Application No. 60/478,237, filed Jun. 13, 2003, and of U.S. Provisional Application No. 60/491,567, filed Jul. 31, 2003, each of which is incorporated herein by reference.

BACKGROUND OF THE INVENTION

1. Field of the Invention

This invention relates to transmission of information along a tubular string, and more particularly to a system for acoustically transmitting signals across a connection in the tubular string.

2. Description of the Related Art

The oilfield industry currently uses two extremes of communication within wellbores. The classification of these two extremes relates to the timing of the wellbore construction, typically during the wellbore construction and after construction during the operation of the wellbore for production of hydrocarbons.

During the drilling and completion phases, communication is accomplished using a form of mud pulse telemetry commonly utilized within measurement while drilling (MWD) systems. Alternative methods of telemetry, such as low frequency electromagnetic and acoustics, have been investigated and found to be of limited or specialized use. In general MWD telemetry is bound by the speed of sound and the viscous properties in the drilling fluid, thus data rates for mud pulse telemetry seldom exceed 10 bits per second.

An increase in the number and complexity of downhole sensors in MWD systems has increased the need for higher data rates for the telemetry link. Also, introduction of rotary closed loop steering systems has increased the need for bi-directional telemetry from the top to the bottom of the well.

Industry efforts to develop high data rate telemetry have included methods to incorporate fiber optic or wire technology into the drillstring, transmitting acoustic signals through the drill string, and transmitting electromagnetic signals through the earth surrounding the drill string. U.S. Pat. No. 4,095,865 to Denison, et al., describes sections of drill pipe, pre-wired with an electrical conductor. However, each section of pipe is specially fabricated and difficult and expensive to maintain. Acoustic systems suffer from attenuation and filtering effects caused by reflections at each drill joint connection. Attempts have been made to predict the filtering effects, for example see U.S. Pat. No. 5,477,505 to Drumheller. In most such techniques, signal boosters or repeaters are required on the order of every 1000 feet. To date, the only practical and commercial method of MWD telemetry is modulation of mud flow and pressure with it's relatively slow data rate.

Once a well is drilled and completed, special sensors and control devices are commonly installed to assist in operation of the well. These devices historically have been individually controlled or monitored by dedicated lines. These controls were initially hydraulically operated valves (e.g. subsurface safety valves) or were sliding sleeves operated by shifting tools physically run in on a special wireline to shift the sleeve, as needed.

The next evolution in downhole sensing and control was moving from hydraulic to electric cabling permanently mounted in the wellbore and communicating back to surface control and reporting units. Initially, these control lines provided both power and data/command between downhole and the surface. With advances in sensor technology, the ability to multiplex along wires now allows multiple sensors to be used along a single wire path. The industry has begun to use fiber optic transmission lines in place of traditional electric wire for data communication.

A common element of these well operation sensors and devices is the sending of power and information along the installed telemetry path. The telemetry path is typically installed in long lengths across multiple sections of jointed tubular. Thus, the installation of the telemetry path is required after major tubulars are installed in the well. The devices along the telemetry path must comply with a common interface and power specification. Any malfunction in the line puts the power transmission and communication in jeopardy.

Thus, there is a demonstrated need for higher data rate telemetry systems with bi-directional transmission capability for use with jointed tubulars.

SUMMARY OF THE INVENTION

In one aspect of the present invention, a system for communicating between a first location and a second location, comprises a jointed tubular string having a first section and a second section connected at a connection joint, with the tubular string having a fluid in an internal passage thereof. A first acoustic transducer is mounted in the internal passage of the first section proximate the connection joint, and a second acoustic transducer is mounted in the internal passage of the second section proximate the connection joint. A signal transmitted from the first location to the second location is transmitted across the connection joint as an acoustic signal in the fluid from the first acoustic transducer to the second acoustic transducer.

In another aspect, a method for communicating between a first location and a second location comprises providing a jointed tubular string between the first location and the second location, where the jointed tubular string has a first section and a second section connected at a connection joint. The jointed tubular string has a fluid in an internal passage thereof. A signal is transmitted from the first location to the second location across the connection joint as an acoustic signal in the fluid from the first acoustic transducer to the second acoustic transducer.

BRIEF DESCRIPTION OF THE DRAWINGS

For detailed understanding of the present invention, references should be made to the following detailed description, taken in conjunction with the accompanying drawings, in which like elements have been given like numerals, wherein:

FIGS. 16A,B are schematic drawings of a section of drill string having a waveguide attached thereto, according to an embodiment of the present invention;

FIG. 25 is schematic drawing of a jointed tubular string having acoustic transducers located for transmitting acoustic signals across connection joints;

FIG. 26 is a schematic drawing of exemplary acoustic transducer locations and signal paths.

DESCRIPTION

Figure 1:
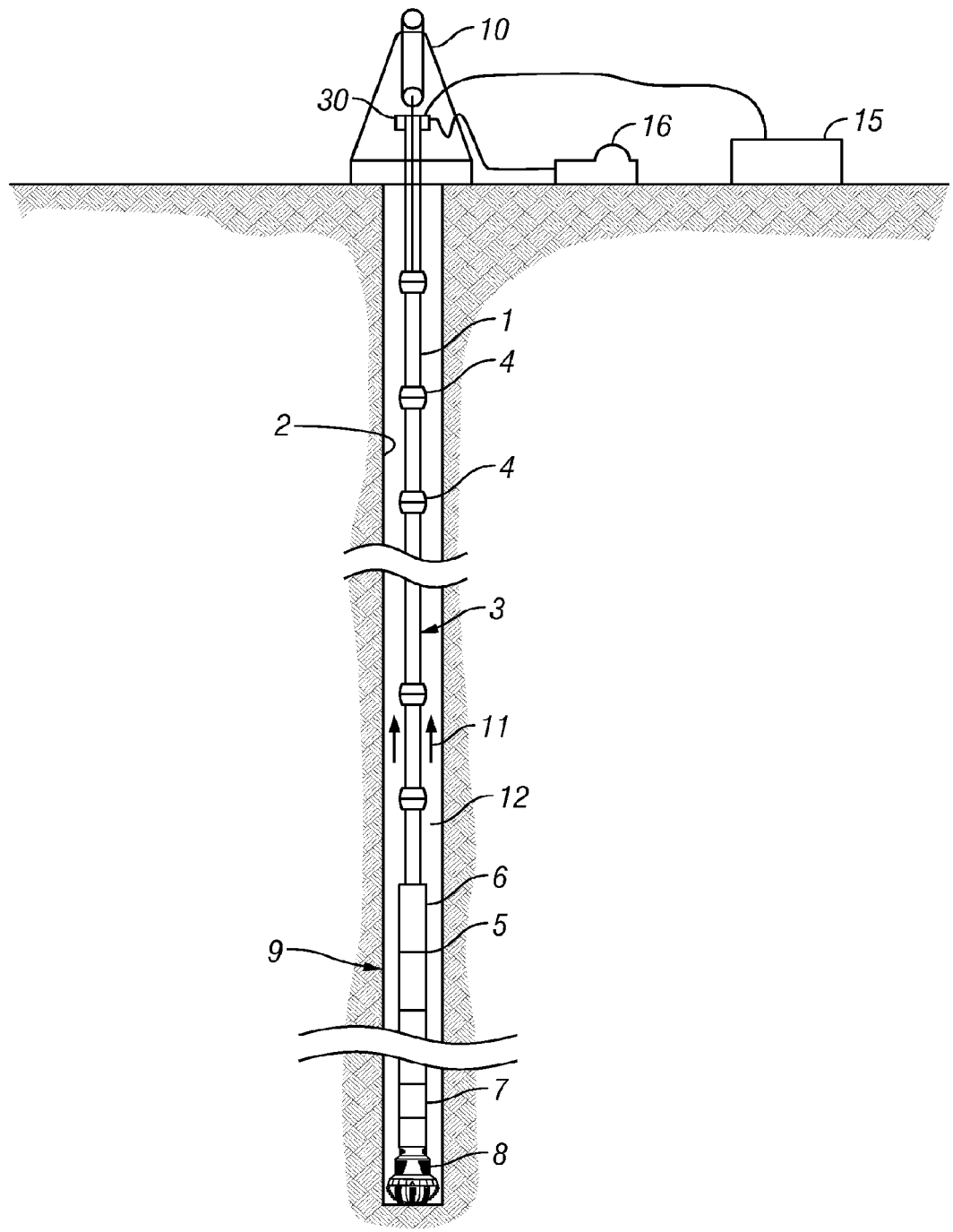
FIG. 1 is a schematic drawing of a drilling system having a jointed tubular string in a borehole according to an embodiment of the present invention.

In one embodiment, see FIG. 1, and described herein as an example and not as a limitation, a drilling operation has a conventional derrick 10 for supporting a drill string 3 in a borehole 2, also called a wellbore. Drill string 3 comprises multiple sections of drill pipe 1 connected together by threaded connections 4. A bottomhole assembly 9 is attached to the bottom end of drill string 3 and has a drill bit 8 attached to a bottom end thereof. Drill bit 8 is rotated to drill through the earth formations. Bottom hole assembly 9 comprises multiple sections of drill collars 6 and may have a measurement while drilling (MWD) system 7 attached therein, above bit 8. Drill collar sections 6 and MWD system 7 are connected through threaded connections 5. Measurement while drilling and/or logging while drilling (LWD) systems are well known in the art. Such systems commonly measure a number of parameters of interest regarding the drilling operation, the formations, surrounding the borehole 2 and the position and direction of the drill bit 8 in the borehole 2. Such systems may include downhole processors (not shown) to provide open or closed loop control, in conjunction with a steerable system (not shown), of the borehole 2 path toward a predetermined target in the subterranean formations.

Drilling fluid 11, commonly called drilling mud, is pumped by pump 16 through the drill string 3, exits the bit 8, and returns back to the surface in the annulus 12 between drill string 3 and borehole 2. Drilling flow rates may commonly range from the order of 100 gpm to in excess of 1000 (gallons per minute), depending, at least to some extent, on the borehole size and the ability of the fluid to remove the cuttings from the borehole. The potential energy in the drilling fluid flowing through the drill string is typically well in excess of 100 kilowatts.

Figure 2:
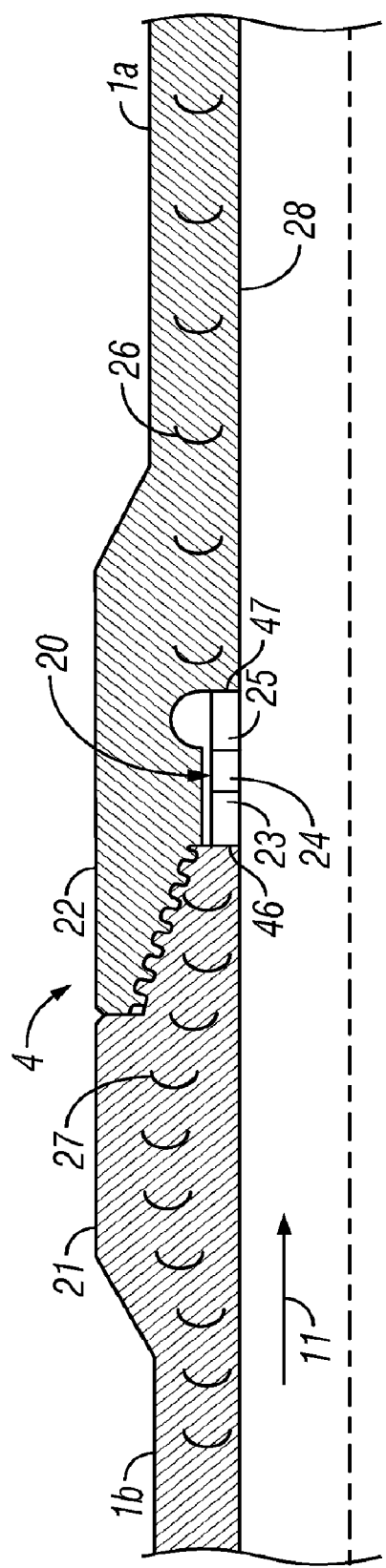
FIG. 2 is a schematic drawing of a jointed connection having an autonomous telemetry station disposed therein, according to an embodiment of the present invention.

Located at each of the threaded connections 4 and 5 is an autonomous telemetry station (ATS) 20, see FIG. 2, located between internal shoulders of the pin section 21 and the box section 22 making up the threaded connection 4 of two sections of drill pipe 1. ATS 20 is a torus, or donut, shaped ring captured by the pin shoulder, also called pin nose, 46 and the boreback box shoulder 47. In one embodiment, ATS 20 comprises a signal receiver 25, a signal transmitter 23, a controller 24, and a power source (not shown). ATS 20 may also contain sensors (not shown) for measuring parameters of interest related to the drilling process and the formations surrounding the borehole 2. The components of ATS 20 may be encapsulated in a suitable compliant material, for example an elastomer, such that ATS 20 is compressed a predetermined amount between the pin nose 46 and boreback shoulder 47 and may be installed in the field during the makeup of each connection. Suitable elastomers are known in the art and are commonly used for submerged acoustic transducers. By locating an ATS 20 at each threaded joint 4 and 5, signals communicated along the drill string 3 need only have sufficient strength to travel between each ATS 20, or between antennas connected to each ATS as described later. The attenuation and interference associated with transmitting signals across multiple connections is no longer a limiting factor. Therefore, low power transmissions are suitable for communicating signals containing substantially increased data rates over the length of the drill string 3. ATS 20 operates on power levels on the order of tens of milliwatts to a few watts as contrasted to conventional downhole telemetry systems that operate on tens to hundreds of watts. As shown in FIG. 2, an acoustic signal 26 travels through a section of drill string 1a toward connection 4. The signal is transmitted from the section of drill string 1a to the receiver 25 in ATS 20. ATS 20 processes the signal and retransmits the signal using transmitter 23 into the next section of drill string 1b. The process is repeated at each connection in drill string 3 and is detected by a surface located transceiver 30 attached to surface controller 15, see FIG. 1. Similarly, signals may be transmitted from the surface system to a downhole ATS 20 and/or to MWD system 7 in FIG. 1, and/or between multiple ATS devices. The receiver 25 and the transmitter 23 may be piezoelectric devices that are well known in the art. Such devices may be adapted to act interchangeably as receiver or transmitter to enable bi-directional communication.

In one embodiment, the power source for each ATS 20 scavenges, or harvests, electrical power from sources of potential energy at the location of each ATS 20. For example, mechanical vibration from the tubular elements of the drill string and/or inefficient fluid motion (such as parasitic velocity head loss) related energy may be extracted from the drill string and the fluids moving inside the drill string. Similar sources of energy are present, for example, in production strings and pipelines and are intended to be covered by the invention disclosed herein. The scavenged power may come from naturally occurring "lost" energy, such as existing tubular vibration energy or existing fluid differential pressures (caused by existing geometry). Alternatively, devices or geometries near each ATS may be adapted so as to cause a vibration for mechanical energy or a fluid derived energy (turbulence or differential pressure) for scavenging by the ATS. In addition to harvesting existing wasted energy from the existing process, additional devices may be inserted in the flow stream or in the drill string, remote from the ATS, that induce additional energy within the tubular system and/or flow stream for scavenging by the ATS.

Figure 11A:
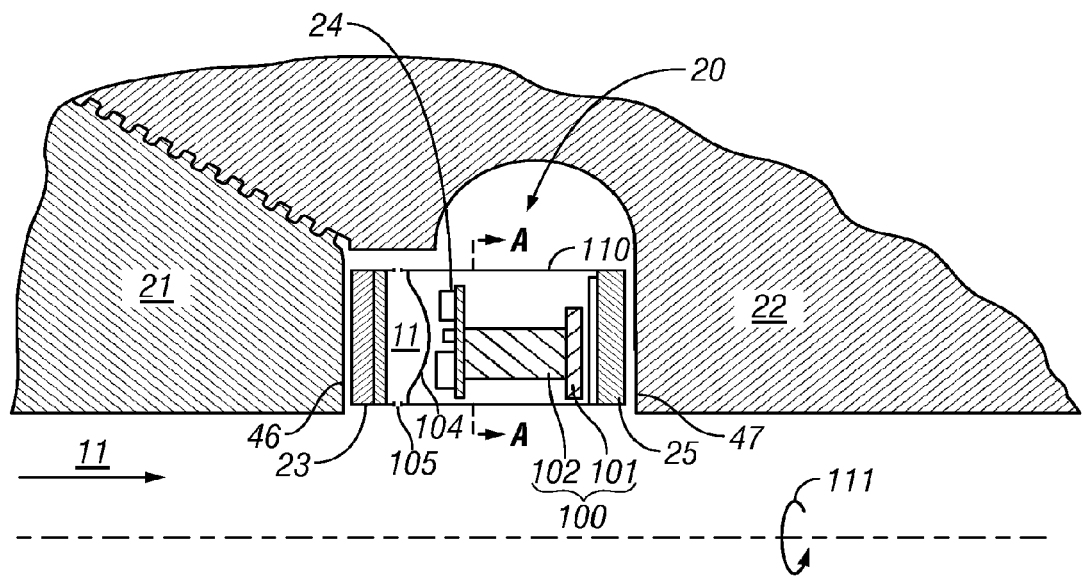
FIGS. 11A,B are schematic drawings of a piezoelectric power generator according to an embodiment of the present invention.
Figure 11B:
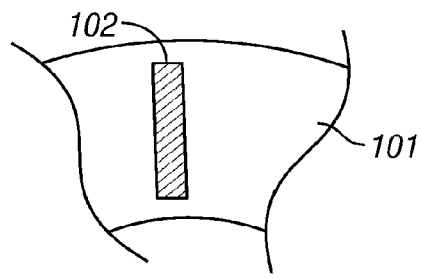

It is well known in the art that the drill string 3 vibrates, both axially, rotationally, and laterally, during the drilling process. In addition, the drilling fluid 11 is typically in turbulent flow inside the drill string at normal operating flow rates. Both the vibrational energy of the drill string 3 and the turbulent flow energy of the drilling fluid 11 provide sources of potential energy that may be converted, by suitable techniques, to provide sufficient power for ATS 20. In one embodiment, piezoelectric materials are used to harvest electrical power from at least one of these potential energy sources. As is well known, when a force is applied to a piezoelectric material, positive and negative charges are induced on opposite crystal surfaces. Such materials as quartz and barium titanate are examples of piezoelectric materials. Various mechanical mounting arrangements expose the piezoelectric materials to the vibrational motion of the drill string for generating power. For example, piezoelectric materials may be mounted in ATS 20 of FIG. 2, such that they react to the general vibration motion of the drill string 3. The materials may be mounted as discrete crystals. For example, referring to FIGS. 11A,B, one embodiment of an ATS 20 is shown with an integral power source 100. ATS 20 has a controller 24 and power source 100 in a housing 110 with receiver 25 and transmitter 23 captured between pin nose 46 and boreback shoulder 47. Controller 24 has suitable circuitry for converting the power signals from power source 100 to suitable voltages for the various devices, as required. Power source 100 comprises an annular ring mass 101 attached to multiple piezoelectric bars oriented around the donut shaped annular configuration of ATS 20. As the drill string moves according to the arrows 111, the inertial mass of ring 101 causes the piezoelectric bars 102 to flex creating bending loads and generating electrical power. The components are contained in housing 110 that is filled with a dielectric fluid 103. Dielectric fluid 103 is separated from drilling fluid 11 by flexible diaphragm 104. Drilling fluid is vented through compensation hole 105 such that the downhole pressure and temperature are equalized inside the housing 110. Alternatively, each piezoelectric bar 102 may have a mass consisting of a segment of a ring (not shown) such that the bar/mass system is free to respond to both lateral and whirling motion of the drill string.

Figure 3:
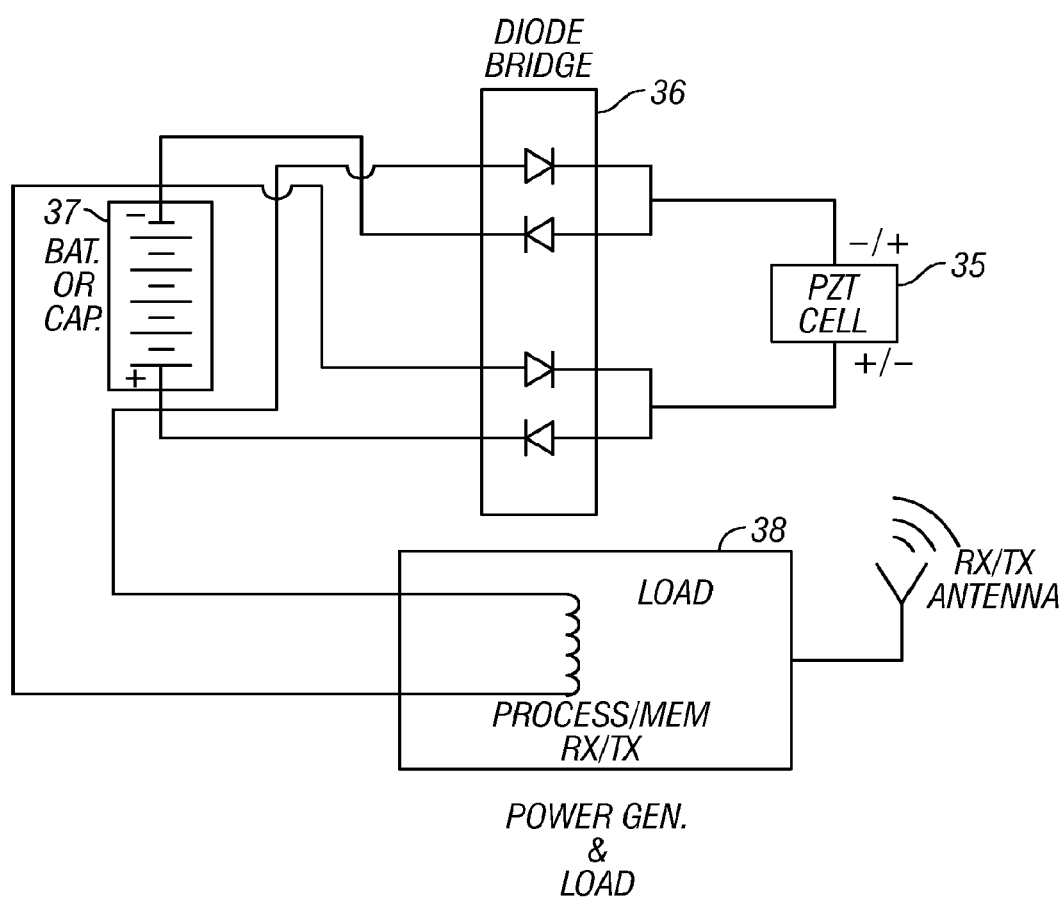
FIG. 3 is an electrical schematic of a circuit for providing power from a piezoelectric device, according to an embodiment of the present invention.

Alternatively, the piezoelectric materials may be formed as any number of micro-electromechanical systems (MEMS) type devices. For example, piezoelectric MEMS accelerometers are commercially available that generate electrical signals in response to vibrational energy. Such devices may be configured to generate electrical power. FIG. 3 shows an exemplary circuit for converting the output of a piezoelectric device 35. The output from piezoelectric device 35 is rectified by diode bridge 36 to charge a power storage device 37 that supplies power to the load 38 that may be any combination of electrically powered devices in ATS 20. Multiple voltages from multiple such piezoelectric devices may be rectified across a common diode bridge. The power storage device is preferably a capacitor but may alternatively be a rechargeable battery. Multiple capacitors and/or batteries may be used.

Figure 4:
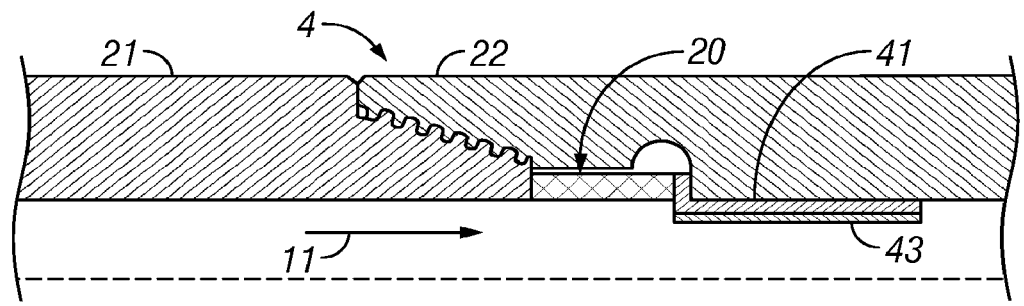
FIG. 4 is a schematic drawing of a galvanic power source, according to an embodiment of the present invention.
Figure 5:
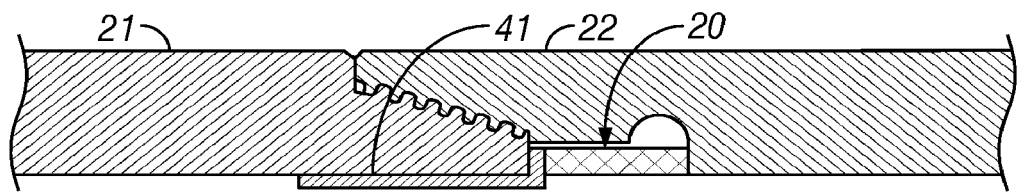
FIG. 5 is a schematic drawing of an autonomous telemetry station having an extension sleeve extending into an adjacent section of drill string, according to an embodiment of the present invention.

In another embodiment, see FIG. 4, ATS 20 has an extension tube 41 attached thereto. Extension tube 41 extends a predetermined distance into the bore 42 of the box connection 22. Extension 41 may extend (i) downstream from ATS 20; (ii) upstream from ATS 20 into the pin connection 21, see FIG. 5; or (iii) in both upstream and downstream directions (not shown). Extension 41 may have piezoelectric devices embedded therein, such that such devices react to pressure variations in the fluid flow 11. Such pressure variations may be due to turbulent fluctuations in the fluid and/or due to pressure fluctuations caused by the positive displacement pump 16 that pumps the drilling fluid 11 through the drill string 3. The extension 41 may have a piezo-polymer material, such as polyvinylidene difluoride (PVDF) attached to the inner surface such that the PVDF film (not shown) is exposed to the flow energy to generate electrical power. The extension tube 41 length may be chosen such that sufficient area is exposed to the flow to generate sufficient power, including extending the tube substantially the length of a section 1 of drill string 3. The power harvested from such systems in the fluid flow may be used to power ATS 20.

Figure 24:
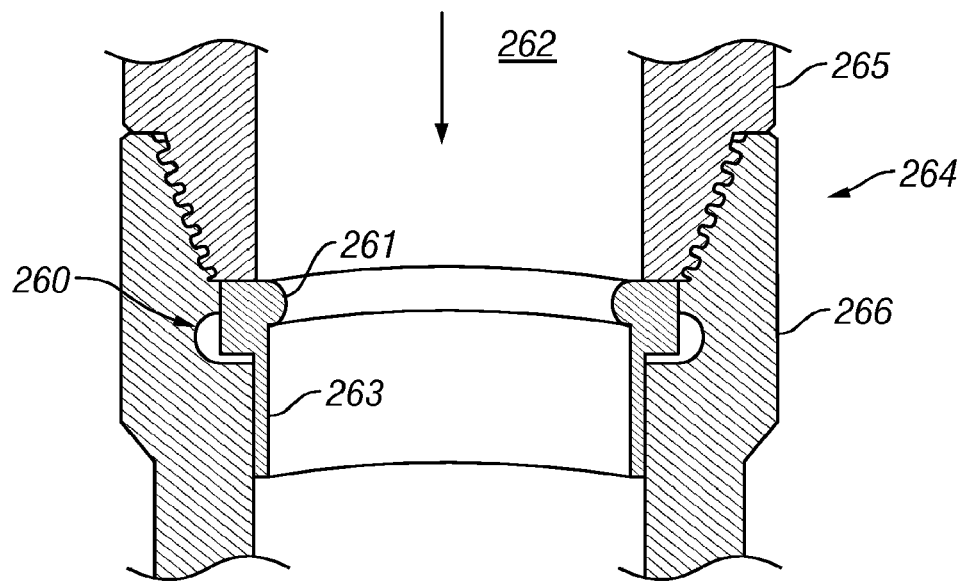
FIG. 24 is a schematic drawing of a system for creating flow eddies and generating power therefrom, according to an embodiment of the present invention.

In another embodiment, turbulence inducing protuberances (not shown) may be positioned on the ATS and/or along an extension sleeve and extended into the flow stream to induce turbulent eddies in the flow stream that contain sufficient energy. Such protuberances can be used with any of the piezoelectric fluid scavenging techniques. Such protuberances include, but are not limited to button shape or ring shape. Alternatively, dimples may be spaced around the donut shaped ATS and/or along an extension sleeve to induce turbulence. In one embodiment, see FIG. 24, ATS 260 is made of a suitable elastomeric material and is captured between sections 265 and 266 at connection 264. ATS 260 has a sleeve 263 attached thereto having piezoelectric materials (not shown) incorporated, as previously described therein. ATS 260 is sized such that a predetermined protuberance 261 is generated when the connection is made up. Protuberance 261 causes turbulent eddies (not shown) to be created that impact sleeve 263 causing voltages to be generated from the incorporated piezoelectric materials. The voltages are rectified by circuits in ATS 260.

In another embodiment, extension 41 is made of an electrically insulating material and has a sacrificial anode sleeve 43 is attached to an inner diameter thereof. A galvanic current is established between the sacrificial anode and the steel drill string 3 in the presence of a conductive drilling fluid 11. Using techniques known in the art based on the materials used and the conductivity of the drilling fluid 11, a predetermined amount of power may be generated for use in powering ATS 20.

Alternatively, extension 41 may contain a suitable number of batteries suitable for downhole use. The batteries may be expendable and replaceable or rechargeable. Any suitable form configuration of battery may be used consistent with the space constraints known in the art. Redundant batteries may be provided.

Other techniques may be used, alone or in combination with any other of the techniques previously described to provide sufficient power to ATS 20. These techniques include, but are not limited to, (i) thermoelectric generators based on temperature differentials between the inside and outside of the drill string 3; (ii) micro fuel cell devices; (iii) photon absorption from natural gamma emission of the surrounding formation; (iv) photon absorption from natural gamma emission from a source carried downhole; (v) long piezoelectric film streamers, or socks, adapted to flutter in the flowing drilling fluid thereby amplifying the motion experienced and power generated; (vi) magneto-hydrodynamic generators; and (vii) eccentric mass generators. Such a micro fuel cell device may be contained in ATS 20 and be self contained with sufficient fuel and oxidizer for operating for a predetermined period.

Figure 13:
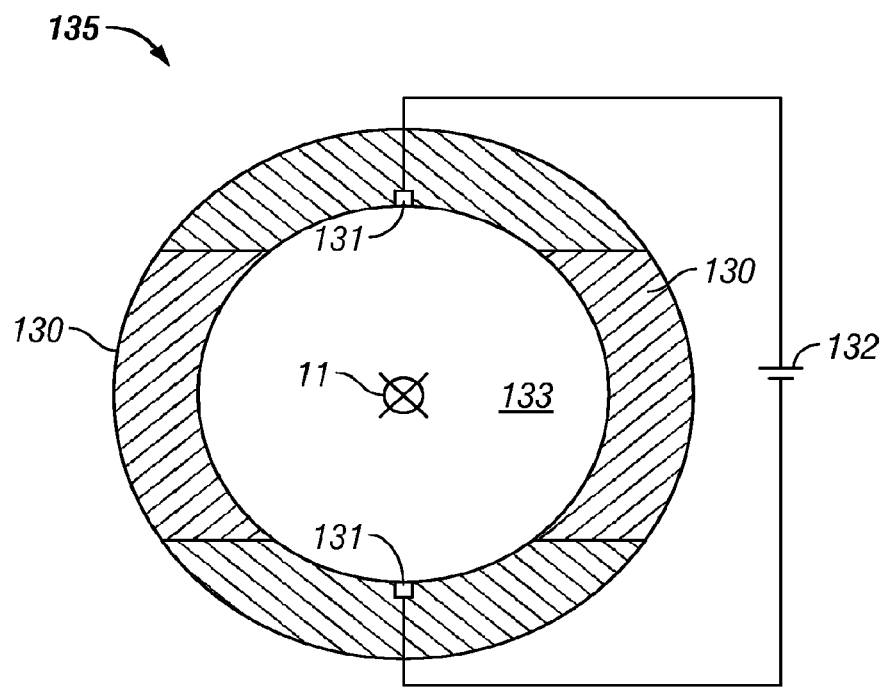
FIG. 13 is a schematic drawing depicting a magneto-hydrodynamic power generator for use as a power source according to an embodiment of the present invention.

In one embodiment, see FIG. 13, permanent magnets 130, are arranged in ATS 135 such that they induce a magnetic field across fluid flow area 133. As is known in the art, when a conductive fluid 11 flows through the magnetic field, either into or out of the plane as indicated in FIG. 13, voltages are induced at electrodes 131 in a plane orthogonal to both the plane of the magnetic field and the direction of the flow. Such voltages may be used to generate power stored in source 132.

In yet another embodiment, an annular coil (not shown, is disposed in an ATS 20 such that drilling fluid 11 passes through the center of the coil. The drilling fluid has ferromagnetic particles, such as hematite, dispersed therein. The flow of magnetic particles through the coil induces electric currents in the coil that may be stored in a power source for use in the ATS.

Figure 14:
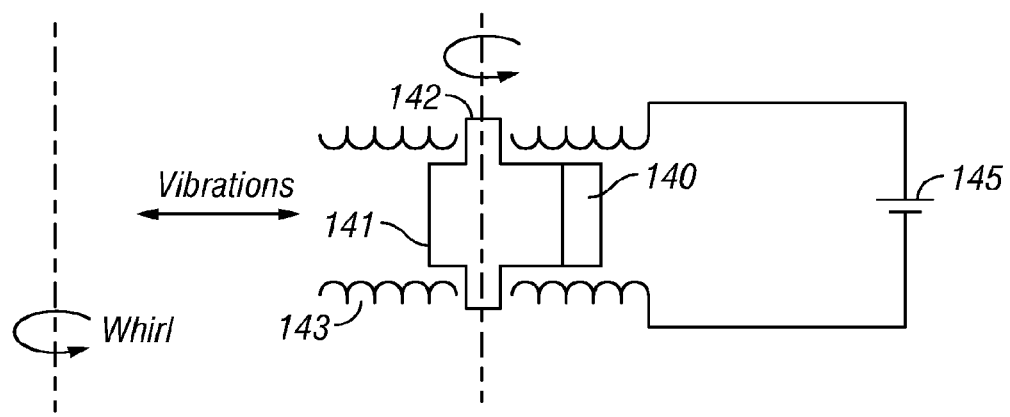
FIG. 14 is a schematic drawing of an eccentric mass generator for use in an autonomous telemetry station according to an embodiment of the present invention.

In another embodiment, see FIG. 14, an eccentric mass 141 pivots about a shaft 142 in proximity to coils 143 mounted in an ATS in a drill string. Permanent magnet 140 is disposed in the mass 141 near an outer end. As the mass 141 is exposed to lateral vibration and torsional whirl of the drill string, the mass will be induced to rotate magnet 140 past coils 143 and inducing a current to flow in the coils that may be stored in power source 145. Many such eccentric masses may be bridged and rectified together, such as in a MEMS device, to generate power from the motion of the drill string.

Figure 15A:
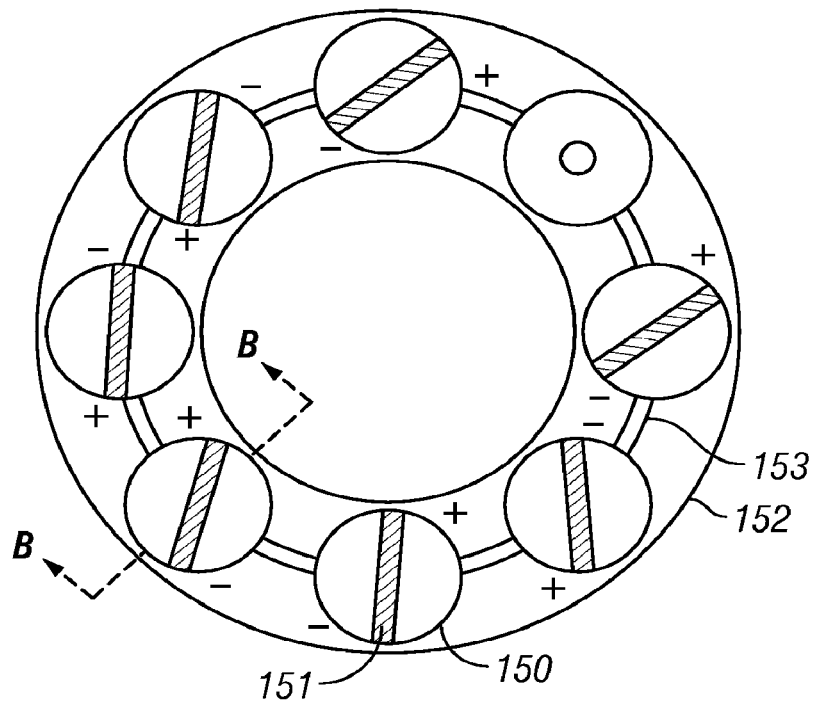
FIGS. 15A,B are schematic drawings of a rolling ball generator for use in an autonomous telemetry station according to an embodiment of the present invention.
Figure 15B:
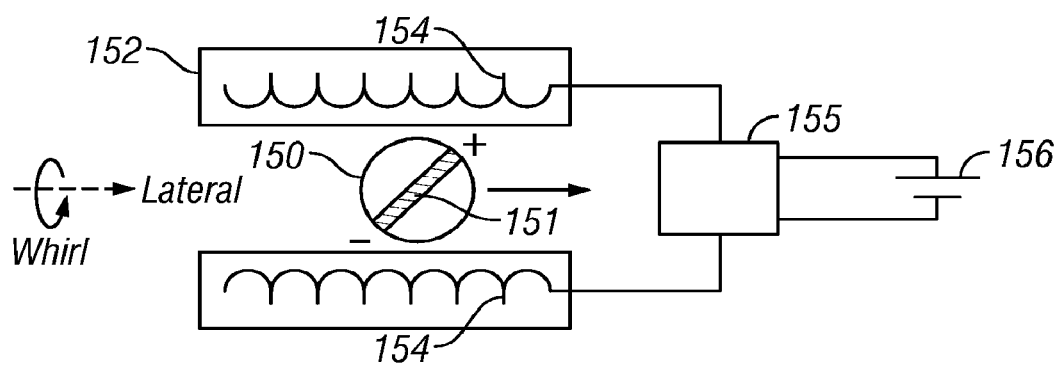

In another embodiment, see FIGS. 15 A-B, a plurality of balls 150 are constrained to roll between coil assemblies 152 in response to lateral vibration and whirl of the drill string. Each ball has a permanent magnet 151 such that as the ball with the magnet rolls, it passes the magnetic flux lines through the coils 154 in coil assemblies 152. The induced currents and related voltages are rectified by bridge 155 and stored in power source 156.

Figure 6:
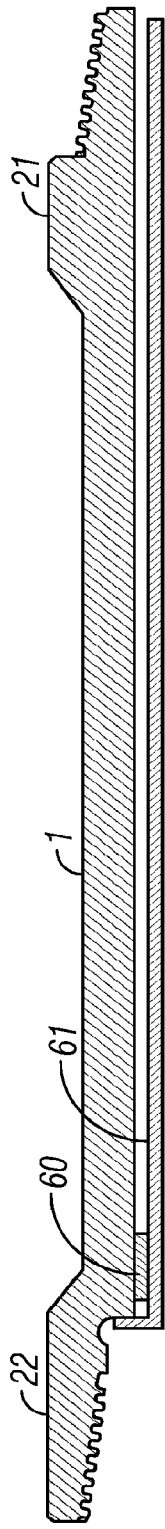
FIG. 6 is a schematic drawing of an autonomous telemetry station having an extension sleeve extending substantially the length of a section of drill string, according to an embodiment of the present invention.

As an alternative, or used in combination with the above discussed compliant donut ring, the complete power, sensor and communication elements may be packaged in a sleeve that protrudes into the tubular above or below the tool joint of interest. In one embodiment, the sleeve, see FIG. 6, is a rigid thin wall tube 61 that is be dropped or pushed into a connection joint. Bonded to tube 61, or encapsulated therein, is an ATS 60 having a receiver, a controller, a transmitter and other elements including sensors and any power device, as previously described, and/or electrical or optical conductors (not shown) required to enable alternative communication methods described later. For example, antenna wires (not shown) may be attached to, or alternatively, embedded in the sleeve along the length of the sleeve for enabling RF and EM communication, as described later, and the sleeve may extend the length of the section of drill string 1. The tube may be substantially pressure neutral (immersed) into the drilling fluid 11 within the drill string 1 and all components are electrically and mechanically insulated and isolated from the section of drill string 1 and drilling fluid 11. The rigid sleeve 61 may be constructed of any number of materials, including, but not limited to plastics, fiber reinforced composites, and metal. The materials may be deigned to be expandable. The material selection is dependent on the function of the sleeve 61 as related to power generation and/or radio wave transmission, and may be selected by one skilled in the art without undue experimentation.

Figure 7:
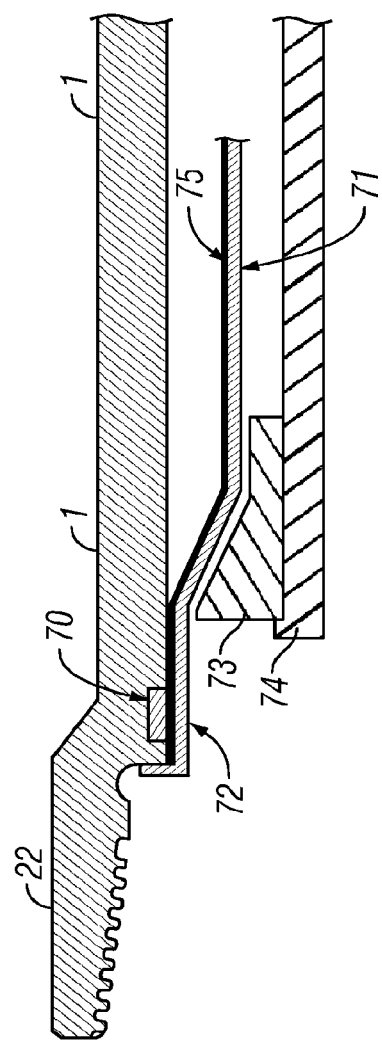
FIG. 7 is a schematic drawing of method of expanding a sleeve into a section of drill string, according to an embodiment of the present invention.

In another embodiment, see FIG. 7, sleeve 71 is a plastically deformable sleeve that is smaller in diameter than the ID of the section 1 of drill string 3 to which it is to be inserted. The OD of the inserted sleeve 71 may be coated with a material 75, such as an elastomer or a plastic material, that has electrical and/or optical conductors and other required components pre-placed within the material 75. The under size sleeve 71 is inserted and then expanded by a mandrel 73 pulled with rod 74 so that the expanded sleeve 72 is plastically deformed and placed in compression against the inside surface of drill string section 1 and anchors the expanded sleeve 72 within drill string section 1. One technique to remove expanded sleeve 72 is an internal spiral cutter (not shown), known in the art, that allows the cut sleeve to be pulled out in an elongated ribbon.

Figure 8A:
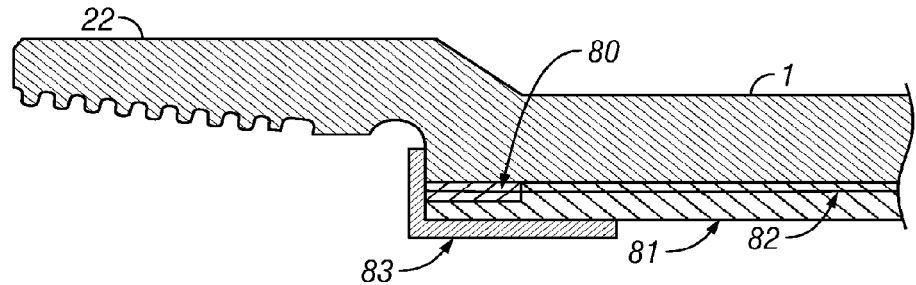
FIG. 8A-B are schematic drawings of a method of installing an elastic sleeve into a section of drill string, according to an embodiment of the present invention.
Figure 8B:
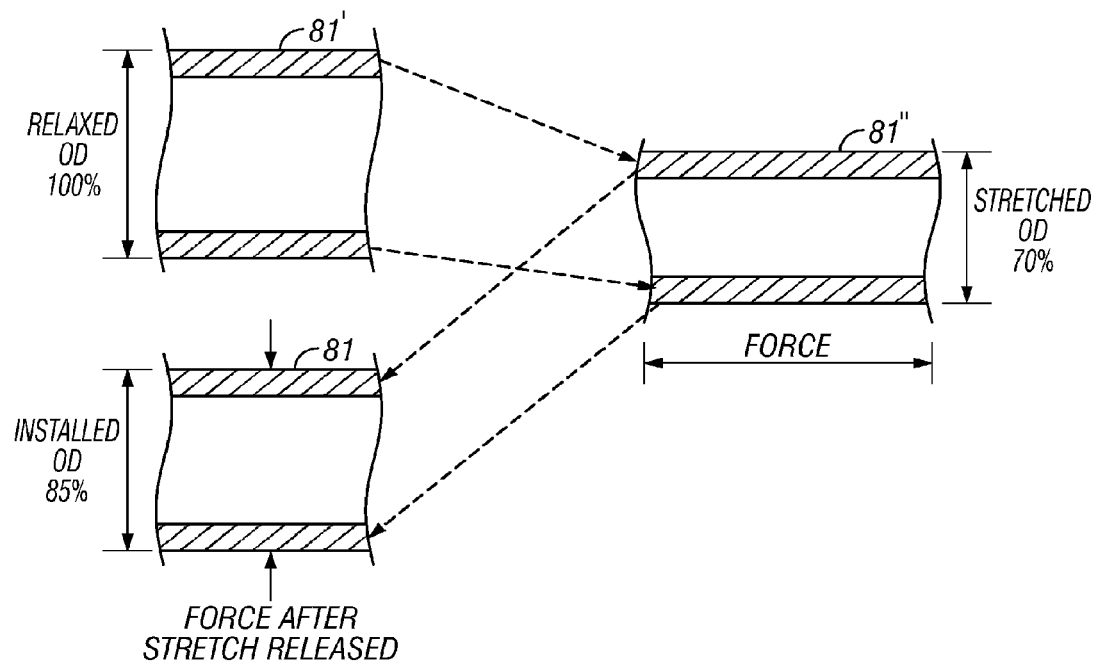

In another embodiment, see FIGS. 8A,B, an elastic sleeve 81, for example of a rubber material suitable for downhole use, has ATS 80 and antenna 82 encapsulated therein. Sleeve 81 has a relaxed diameter 81' greater than the internal diameter of drill string section 1. By stretching sleeve 81' in a lengthwise direction using techniques known in the art, the OD of the sleeve 81' is reduced to that of 81". If stretched the correct amount, then sleeve 81" may be placed within section 1 without interference. Once in place, the elongating force is released and the tube elastically expands into contact with the inner diameter of section 1, providing a locating and restraining force between the OD of sleeve 81 and the ID of section 1. Additional anchoring may be provided by an external bonding agent (not shown). An upper end restraint or anchor 83 may be used to add sealing and prevent flowing fluids from stripping the sleeve 81 from section 1. Anchor 83 may be swaged or expanded during the final installation process. Removal of the inserted sleeve 81 may be by a re-stretching and removal technique or alternatively by a spiral cut technique, as discussed above.

The previously described communication system discloses a signal acoustically transmitted through the material of each section 1,6 of the drill string 3. Other localized communication techniques include, but are not limited to, (i) radio frequency transmissions, (ii) low frequency electromagnetic transmission, (iii) optical transmission, and (iv) back reflectance techniques. As used herein, radio frequency (RF) transmission refers to transmissions in the range of approximately 10 kHz to 10 GHz, whereas low frequency electromagnetic (EM) transmission refers to transmissions in the range of approximately 20 Hz to 10 kHz.

The previously described acoustic system essentially uses the ATS to transmit a signal across the connection joint and uses the drill string section as a relatively low loss waveguide between connections. RF and EM signal transmission media are the surrounding earth formation and the fluids in the wellbore and formation. It is known in the art that the attenuation in such media is highly dependent on the localized properties including, but not limited to, formation, fluid resistivity, and signal frequency. In some situations, attenuation may be unacceptable for low power transmissions over the distance between connections, typically on the order of 30 feet. However, using the extended sleeve configurations and techniques described previously, the effective transmission distance may be substantially reduced, thereby allowing low power communication between connections, see FIG. 6. For example, miniaturized low power RF transceiver are commercially available and have been described for downhole use wherein an interrogation transceiver is passed in close proximity to an RF identification device for locating specific connections in a wellbore, see U.S. Pat. Nos. 6,333,699 and 6,333,700. Using the sleeve 61, as described in FIG. 6, antenna wires may be run the length of the sleeve 61, providing a transmission length on the order of tenths of a inch to several inches, as required. Similarly, the other sleeve configurations described, can be run the entire length of a drill string section for greatly reducing the transmission lengths, and enabling low power RF and/or EM communication across connections. Alternatively, the sleeve may be of such a length to coaxially overlap the ATS of the adjacent connection for establishing communication.

Figure 12A:
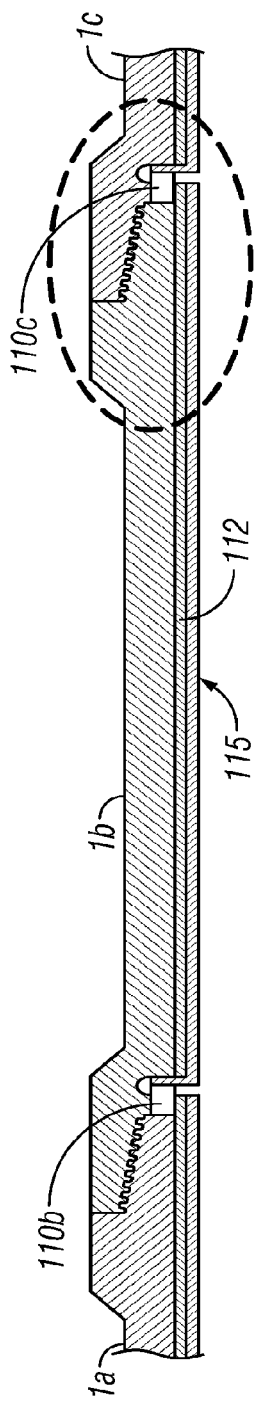
FIGS. 12A-D are schematic drawings of waveguide devices for use with the present invention.
Figure 12B:
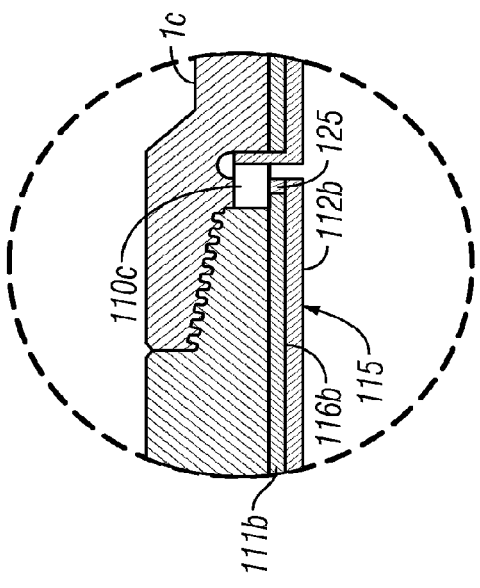
Figure 12C:
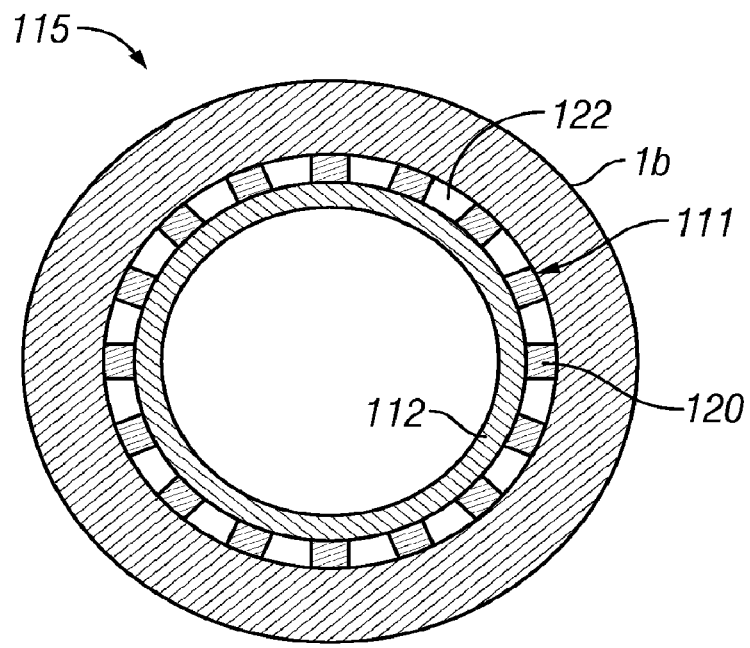

In another embodiment, see FIGS. 12A-D, a waveguide 115 is inserted the length of drill string sections 1b. Waveguide 115 has an external, wave-transmitting section 111 and a reflective inner shield 112 that together channel signal energy from ATS 110c to ATS 110b between the inner diameter of drill string section 1b and reflective shield 112. The transmission medium may be a solid, liquid or gas material depending on the type of energy transmitted and the power available. FIG. 12c shows one example of waveguide 115 with energy reflective inner shield 112 separated by axial ribs, or standoffs, 120 arranged around the periphery of shield 112. For an acoustic system transmission, wave-transmitting section 111 comprises multiple liquid filled channels 122 that are sealed by seal 125 creating a liquid filled waveguide that transmits the acoustic energy from ATS 110c to ATS 110b. Reflective shield 112 may be a composite material having microbeads (not shown) embedded inside. The microbeads have entrapped air and serve to provide an acoustic impedance interface that internally reflects the acoustic signal transmitted to keep the signal within the waveguide channel. By effectively capturing all the transmitted acoustic energy within the channel, the signal is not subject to substantial attenuation that would be present if the wave were transmitted as a normal spherical wave from source to receiver. Such normal transmissions are subject to exponential signal power drop with distance from the source location. Alternatively, the channels 122 may be filled with a gas, for example air, and the signal transmitted is an RF signal. The reflective shield 112 may be a metallic shield for reflecting the RF energy back into the waveguide channels 122. The gas filled channels will provide greatly reduced attenuation as contrasted with RF signals transmitted through the surrounding formation. In an alternative waveguide embodiment, see FIG. 12D, wave transmitting section 120 is sandwiched between reflective shield 121 and drill string section 1b. For an acoustic transmission, transmitting section 120 may be an elastomer material such as rubber. It is known in the art that the acoustic impedance of rubber is on the same order of magnitude as that of water and oil. Therefore, if an acoustic transmitter in ATS 110c, referring to FIG. 12A, transmits into drilling fluid 11 surrounding the transmitter, the signal will readily enter a rubber transmitting section 120 and propagate along the waveguide, provided the reflective shield 121 has an acoustic impedance such that the acoustic energy is trapped in the transmitting section 120. As described previously, the inclusion of gas-filled microbeads in the reflective shield 121 provide an acoustic impedance mismatch such as to reflect the acoustic signals back into the transmitting section.

Figure 12D:
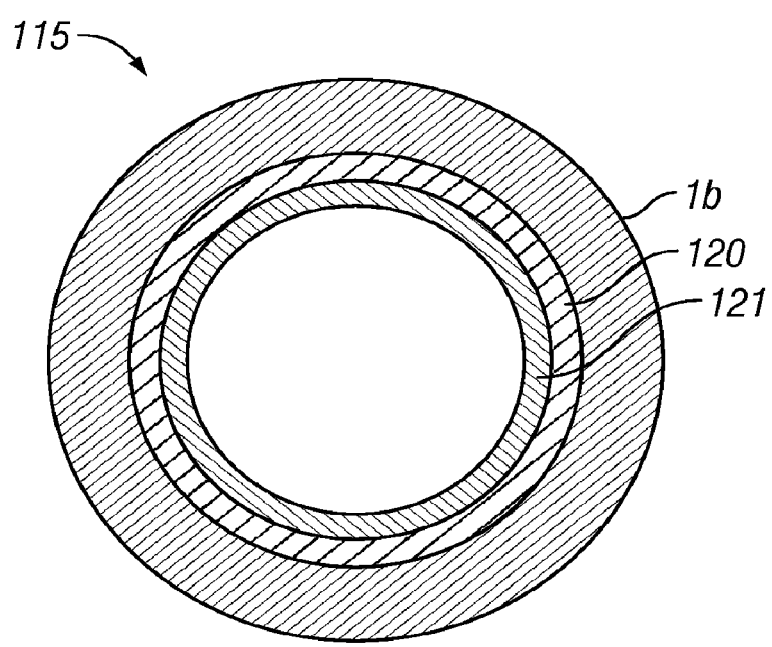

In another example, RF energy may be channeled through a solid insulator layer 120, see FIG. 12D, wherein a suitable reflective shield prevents the RF signal from escaping the waveguide 115. As one skilled in the art will appreciate, there is attenuation associated with the transmission through the insulating material; however, the signal energy is concentrated in the waveguide 115 and does not experience the geometric dispersion associated with free transmission through the surrounding media.

In another embodiment, optical fibers may be run in a sleeve and brought in close proximity to light emitting devices in the ATS of the adjoining connection. Because the transmission distance is short, even a low power optical source may provide sufficient received light energy to be received across the fluid media interface. The fluid interface may contain drilling fluid. Alternatively, the gap may be a controlled environment containing a fluid with suitable optical properties for transmission.

In one embodiment, back reflectance techniques may be used to transmit signals across joint connections. In one example, an oscillating circuit signal run through the conductors in an extended sleeve, sleeve 61 of FIG. 6 for example, of a first section of drill string is affected by an inductive load in the ATS of the adjacent connection to a second drill string section. By switching the inductive load in the ATS between two states, a change may be detected in the oscillating circuit signal in the first section and thereby transmit information across the connection.

In another embodiment, it is known that changes may be imposed on the polarization characteristics of light traveling in an optical fiber by changes in a magnetic field proximate the optical fiber. An ATS is adapted to modulate a local magnetic field to modulate the light traveling in an optical fiber in a sleeve attached to an adjacent section of drill string.

It is an objective of the present invention to provide a fault tolerant, gracefully degrading communication system for use in a borehole drilling and/or completion system. The nature of the particular communication system is dependent, to a large extent, on the transmission characteristics of the surrounding formations and the drilling fluid in the borehole. The concepts disclosed below enable such communications between joints of drill pipe using low energy levels. Depending on the type of communication links used, one of several network structures and operational configurations become viable. The nature of the selected communication devices will determine the practicality of a given network type.

Figure 9:
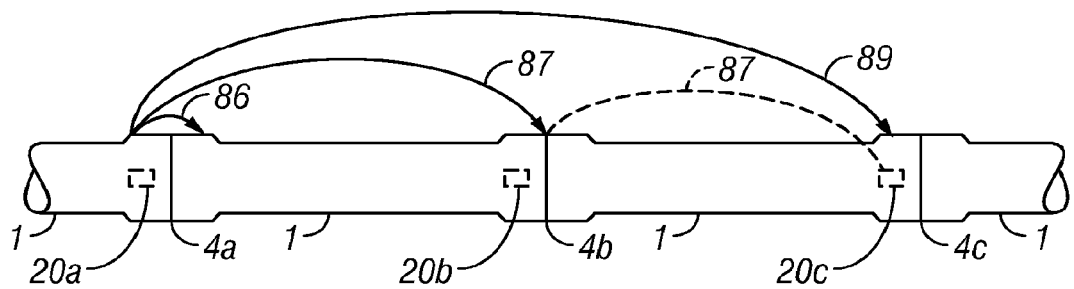
FIG. 9 is a schematic of multiple transmission paths along a jointed tubular string, according to an embodiment of the present invention.

In one embodiment, the communication link is a serial system and transmits at least one of, see FIG. 9, (i) a pin to box short hop across one joint 4a (on the order of ⅛ to 4 inches) 86; (ii) from joint 4a to joint 4b (on the order of 30 to 45 feet)

87; and (iii) across more one than one joint, for example from 4a to 4c (on the order of 60 to 90 feet) 89. Software instructions stored in the downhole controller of each ATS control the communications from each ATS to the next and allow only those joints required to become active, to enable apparently continuous communication along the wellbore or tubular string. For example, each ATS may have a unique address for communication and the order of installation may be controlled such that each ATS in the system knows the addresses of the adjacent ATS. The system will attempt to transmit over the longest distance allowing acceptable transmission integrity. Initially, the system may go through an initial adaptive learning mode of transmitting known predetermined signals sequentially from each ATS to the next in order. By determining, for example, that ATS 20c is receiving the same signal from ATS 20a and ATS 20b, ATS 20c may instruct ATS 20b to enter a quiescent mode and transmit only when ATS 20b has new data, such as local sensor data, to transmit. Should the signal integrity between ATS 20a and 20c degrade below an acceptable, predetermined level, ATS 20c may instruct ATS 20b to begin transmitting information from ATS 20a. In addition, in the event no communication is established, an ATS may alter, according to programmed instructions, its transmission parameters, such as lowering transmission frequency. The ATS may cycle through multiple frequencies seeking suitable communication. Interruptions in signal transmission may result in data stacking, wherein data or signals to be retransmitted are stored in a buffer memory. Such data may be transmitted at a later date or maintained in buffer memory for retrieval at the surface for both data and diagnostic purposes. Signal integrity may be determined from various transmission parameters including, but not limited to, received signal level and data drop outs. In addition, each ATS may include in its data stream, status signals regarding the relative "health" of the ATS. For example, each ATS may transmit information regarding its power storage status and/or it's power generating status. If ATS 20b, for example, is in a quiescent mode and receives status information indicating that ATS 20a is at low power, ATS 20b may, according to programmed instructions in it's controller, begin transmitting signals received from ATS 20a, including the low power status of ATS 20a to alert the rest of the network, including the surface system, to the status of ATS 20a. The surface system alerts the operator who may want to take corrective action, such as replacing ATS 20, the next time the drill string is removed from the borehole.

The previously described system provides a substantially serial communication network. In order to enhance the fault tolerance and graceful degradation characteristics, in another embodiment, multiple parallel communication paths are included along each of the sections of the serial pathway. As shown by way of example in FIGS. 10A,B, an ATS 95 has multiple telemetry modules 90a-h encapsulated in ring 91 suitable for insertion in a threaded connection as described previously. Each module 90a-h has a receiver, a transmitter, and a controller with a processor and memory. Each module 90a-h may also contain, or be connected to, one or more sensors for detecting a parameter of interest. The modules 90a-h may be attached to a power source as described previously. Each module 90a-h may be connected to a separate power source, or, alternatively, they may be connected to a central power source. Any of the power sources previously described may be used. Each of the modules acts to establish a separate communication link with like modules at each connection joint. Examples of such modules are described in U.S. patent application Ser. No. 10/421,475, filed on Apr. 23, 2003, assigned to the assignee of this application, and incorporated herein by reference. The multiple telemetry modules 90a-h may be configured to carry at least one of (i) independent data streams, (ii) redundant data streams, and (iii) multiple paths for a single data stream, thereby providing higher bandwidth for the data stream. The multiple telemetry modules may be directed, under local program control, to allow graceful degradation of bandwidth during periods of high demand, power limitations, and partial system failure. For example, a hierarchy protocol may be established directing a particular telemetry module to be a master module that directs the transmissions of the slave modules at each ATS location. The protocol provides a predetermined order of succession for data transmission should the master module or any other of the slave modules fail. The protocol also provides a hierarchical list of data streams such that as bandwidth capacity is reduced, by failure of a module for example. An exemplary data stream may contain measurements related downhole pressure, temperature, and vibration. It is known that, in most circumstances, the vibration data is significantly more variable over time than is temperature. Therefore, if the transmission bandwidth is reduced, the predetermined protocol may, for example, reduce the transmission of temperature data in order to maintain suitable transmission of vibration data. Note that any number of telemetry modules that can be suitably packaged in the available space may be used with the present system.

Any of the previously discussed transmission techniques may be used with the parallel transmission techniques. For example, multiple transmission frequencies may be used with acoustic, RF, and EM transmissions, and wavelength division multiplexing is common for sending multiple signals over optical systems.

The serial ability to hop across one or more sections, as described above, coupled with the parallel communications techniques, adds substantial reliability to the communication of information along the jointed tubular string.

Any of the previously described autonomous telemetry stations may contain one or more sensors for detecting parameters of interest related to the ATS or the local environment. Such measurements may be added to signals passing through the ATS or, alternatively, be transmitted by the ATS by themselves. Such sensors include, but are not limited to (i) pressure sensors for measuring pressure of the drilling fluid inside and/or outside the drill string; (ii) temperature sensors for measuring drill string and/or drilling fluid temperatures; (iii) vibration sensors for measuring local drill string vibration; (iv) sensors for measuring parameters related to the proper operation of the ATS such as power voltage and/or current levels. In addition, digital diagnostic status of the processor may be transmitted.

In another embodiment, an ATS may communicate with permanently installed devices, for example in a productions string. Such devices may be passive devices that take their power from the signal transmitted by the ATS, or the devices may have batteries or power scavenging devices as described herein.

In another embodiment, an independent sensor module having multiple sensors may be installed in the drill string 3, such as a formation evaluation device (not shown) and/or a device for measuring strain of the drill string section at a predetermined location. Examples of such devices are described in U.S. patent application Ser. No. 10/421475, filed on Apr. 23, 2003, assigned to the assignee of this application, and previously incorporated herein by reference. Such devices may be adapted to communicate with and/or through the ATS network as previously described. Alternatively, such a system may have its own primary telemetry capability, such as a mud pulse system, and use the described ATS system as a fall back system when such primary system fails.

The previous descriptions are described in reference to a drilling system. However, it is intended that the techniques and systems described may be applied to substantially any tubular system, including, but not limited to, (i) production systems, including multi-lateral systems, and including offshore and subsea systems; (ii) water wells; and (iii) pipelines including surface, subsurface, and subsea.

All of the previously described systems are intended to enable bi-directional communication between at least (i) multiple ATS devices, (ii) a surface controller and ATS devices, and (iii) ATS devices and externally located downhole devices. Such surface generated signals may be used to download instructions, including commands, to any and/or all ATS devices. Such transmissions include but are not limited to instructions that may (i) cause changes in operation format of an ATS, (ii) cause an ATS to issue a command to an externally located device, for example a downhole valve in a production string, and (iii) cause the system to reestablish the preferred communication path. In addition, an externally located device, such as a downhole controller in a production string, may direct a signal to another externally located device, such as a valve, through the network of ATS devices.

In another embodiment, see FIG. 16A,B, tubular member 161 has a cross-sectional area substantially less than the internal diameter of drill pipe section 160 and is placed within each section of drill pipe 160. The length of tube 161 is of a predetermined length such that it extends substantially the length of section 160 but does not interfere when connecting drill pipe sections. When the sections of drill pipe are joined, the tubes 161 form a waveguide for bi-directional surface-to-subsurface communication via electromagnetic, optic and/or acoustic energy. Tube 161 provides and/or contains all or part of the transmission medium for communication along the length of section 160. For example, tube 161 may contain one or more electrical conductors 162 and/or optical fibers 165. In one embodiment, at least one optical fiber 165 is firmly attached inside tube 161 which is firmly attached to section 160. Optical fiber 165 is used to determine the strain of the optical fiber 165 caused by the axial loading on section 160. The optical fiber strain may be then related to the loading on section 160 by analytical and/or experimental methods known in the art. Such optical strain measurements may be made by techniques known in the art. For example, at least one fiber Bragg grating may be disposed in optical fiber 165. The Bragg grating reflects a predetermined wavelength of light, related to the Bragg grating spacing. As the load on section 160 changes, the spacing of the Bragg grating changes resulting in changes in the wavelength of light reflected therefrom, which are related to the load on section 160. The optical components for such a measurement may be located in electronics 164 in each tube 161 and the results telemetered along the communication system. Any other optical strain technique is suitable for the purposes of this invention. Alternatively, tube 161 may provide a waveguide path for acoustic and/or RF transmission. Such a waveguide, when firmly attached to section 160 may be used to provide a strain indication of section 160. For example, an acoustic or RF pulse may be transmitted along the wave guide from one end and reflected back from the other end. Changes in the time of flight of the signal may be related to changes in the length of section 160 using analytical and/or experimental methods known in the art. Electronics 164 and transceiver 163 are located at each end of each tube 161 for communicating to and receiving signals from ATS 162. For example, in one embodiment, ATS 162 receives a signal from transceiver 163c, adds data to the signal as required, and retransmits the signal to transceiver 163b for transmission along tube 161a using any of the previously mentioned transmission media. To power electronics 164 and transceiver 163, associated with such communications, the system also provides devices, as previously described, for scavenging energy from available energy sources as described previously. The power source may be integral to the tubes employed for communication or provided by other tubes or systems proximate the communication tube being powered. One example, would employ a piezoelectric material along the length of tube 161 to produce a voltage from the dynamic pressure variations and/or turbulent eddies that occur in the drilling fluid flow as a result of the surface pump pulsations and/or flow perturbations in the drilling fluid flow stream. Tube 161 may be positioned substantially against the perimeter of the internal diameter of the drill pipe 160. The force to hold the tube in position may be provided by mechanical devices, such as by bow springs known in the art, or by a magnetic force provided by magnets distributed along the length of the tube, or by other means such as adhesives, etc. Tube 161 may also be placed substantially centralized in the drill-pipe using bow-spring centralizers (not shown), or other devices known in the art. The tube can be made of a metallic or from a plastic or composite material, such as polyetherether ketone, for example. Communication between tubes may be achieved through electromagnetic, acoustic, optical, and/or other techniques described previously, and relayed through ATS 162. Alternatively, the signals may be transmitted from one transceiver 163b, for example, in tube 161a directly to another transceiver, such as 163c in an adjacent tube 161b.

Figure 27:
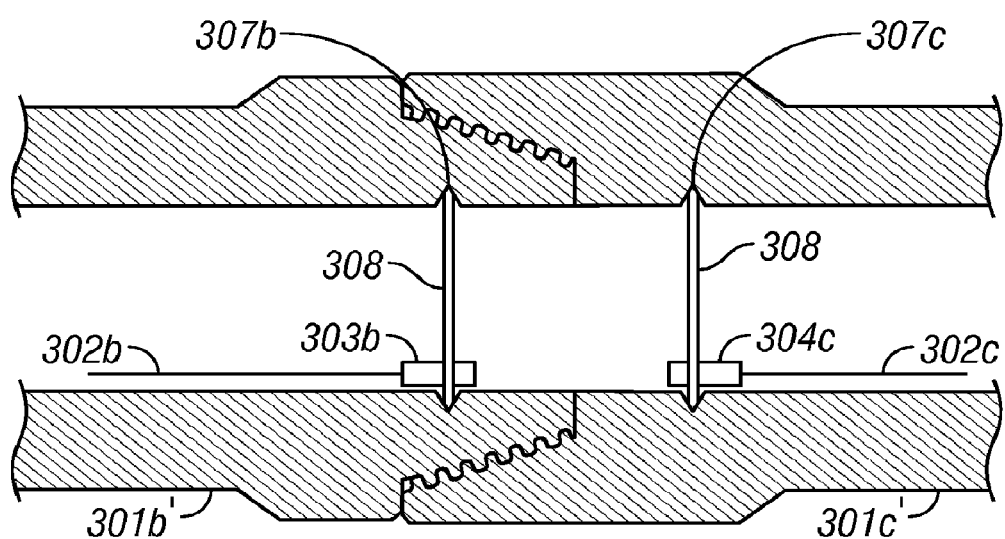
FIG. 27 is a schematic drawing of one possible mounting system for the acoustic transducers in the pipe sections.

In another embodiment, see FIGS. 25-27, a communication system utilizes acoustic transducer 304 to transmit directly through drilling fluid 11 to transducer 303 to transmit information from a downhole tool to the surface. Transducers 304 and 303 may be adapted as stand alone transmitters and receivers or, alternatively, they may each combine the functions of transmitting and receiving in a single device, called transceivers, as described previously. The transducers 303, 304 may be designed to operate at any frequency between about 1 kHz and 20 MHz, with a nominal operating frequency of about 200 kHz. As shown in FIG. 25, transducers 303b and 304b are connected by a conductor 302b. Conductor 302b may be an electrical cable, such as for example, a steel braided cable similar to a wireline logging cable. Alternatively, any suitable cable capable of operating at the downhole conditions is suitable for the purposes of the present invention. Alternatively, the electrical conductor may be contained inside of a tube such as that described in FIGS. 16A,B. Transducers 303 and 304 may be designed to operate using piezoelectric and or magneto-strictive materials known in the art. The physical design of such transducers is within the knowledge of one skilled in the art, without undue experimentation. Each transceiver 303, 304 may be a self-contained autonomous unit having suitable electronic circuits and a power source. In addition, each transceiver 303, 304 may contain a controller having a processor and memory and act according to programmed instructions, similar, for example, to the circuit described in FIG. 3. Any of the power sources described herein may be used to power transducers 303, 304, including a battery, a capacitor, any of the power scavenging devices described herein, or a combination of such devices. For example, a rechargeable battery may be trickle charged by one of the power scavenging/generating techniques described herein.

Transducers 303, 304 may be attached to the inside of drill pipe section 301 using any of the techniques described in this description. Alternatively, see FIG. 27, transducers 303, 304 may be adapted to be restrained in drill pipe section 301' by retaining rings 308 that fit in grooves 307 on the internal surface of drill pipe section 301'. The operational nature of the drilling system makes it improbable that any transceiver pair 303, 304 will be aligned when a pair of drill pipe sections 301 are made up. However, because of the relatively short path length between transducers 303, 304, the angular orientation of the transducers with respect to each other is not critical, as shown in FIG. 26, where signals 306 may be directed between transducers 303b and 304c. However, if the angular alignment results in positions such as 303b and 304c', the path length is substantially the same and the signal is adequately detected. Alternatively, transducers 303, 304 may be integrated to operate in conjunction with any of the autonomous telemetry stations described herein. While described herein in view of having a transceiver 303, 304 at each end of a single pipe section, the present invention may be configured to extend over multiple pipe sections (for example, up to 3 lengths of pipe section) in line with normal drill rig operating parameters. In one mode of operation, signals, such as measured downhole data, may be transmitted from downhole to the surface along the acoustic telemetry path described. The signals is transmitted from transceiver, 304 to transceiver 303 by acoustic signals 306. Once received by transceiver 303, the signals are suitably conditioned and transmitted along conductor 302 to the next transceiver 304 for transmission across the next joint. The technique is repeated until the signal reaches the surface and is decoded and used by the surface system. The use of combined receivers and transmitters at each transceiver 303, 304 allows two way communication and allows updated commands and other information to be transmitted from the surface to the downhole system.

Figure 17A:
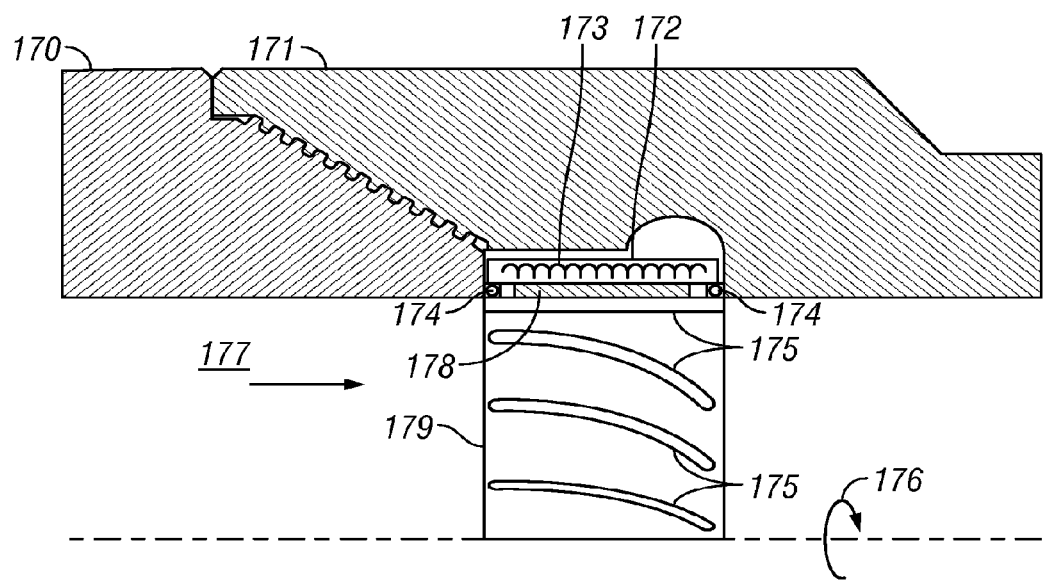
FIGS. 17A,B are schematic drawings of a micro turbine generator in a drill string, according to an embodiment of the present invention.
Figure 17B:
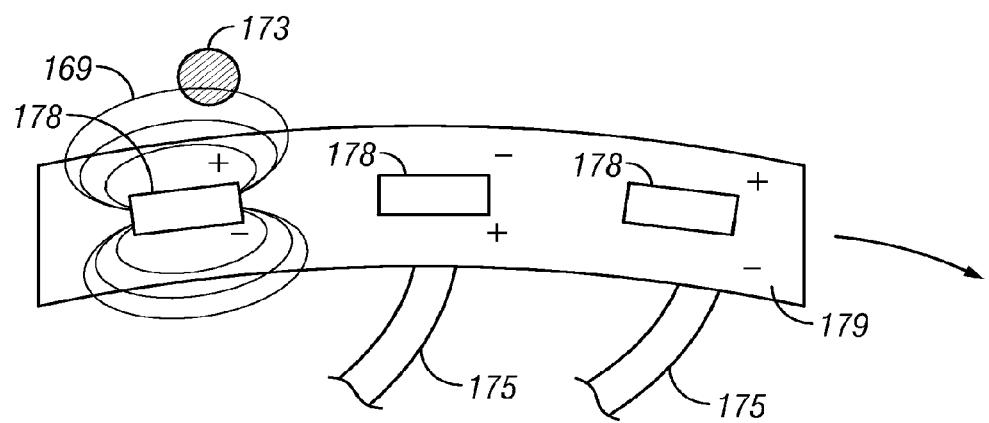

In one embodiment, see FIGS. 17A-B, a micro turbine-generator (MTG) is integrated into ATS 172 for supplying power to ATS 172. The MTG comprises a substantially cylindrically shaped rotor 179 having a number of turbine blades 175 formed on an inner diameter of rotor 179. Turbine blades 175 intercept a portion of the flow of drilling fluid 177 and cause the rotor to rotate as indicated by arrow 176 about the center of the drill string section. Rotor 179 is supported by bearings 174 and has a number of permanent magnets 178 arranged around the periphery of the rotor 179. The magnets are preferably polarized as shown in FIG. 17B and have magnetic field flux lines 169 extending out from each face. The magnets 178 may be any suitable shape, including, but not limited to, bar magnets and disk, also called button, magnets. The magnets are arranged around the periphery of rotor 179 such that alternating positive and negative faces and their magnetic fields pass by at least one stationary electrically conductive coil 173 in ATS 172 and generate alternating voltages therein. More than one coil may be located in ATS 172. Suitable circuitry, known in the art, is located in ATS 172 to convert the alternating voltages to usable power for the sensors and transceivers located in ATS 172 and described previously. The amount of power generated by such an MTG is determinable from techniques known in the art without undue experimentation. The rotor 179 may be made of at least one of ceramic, metallic, and elastomeric materials. The bearings 174 may be made of at least one of ceramic materials, including diamond coated, and elastomeric materials. Such bearings are known in the art and will not be described in further detail. In a system using multiple parallel transceivers at each ATS, such as that described in FIGS. 10A, 10B, for example, each individual telemetry module may have its own coil for generating power from the rotating magnets.

Figure 18:
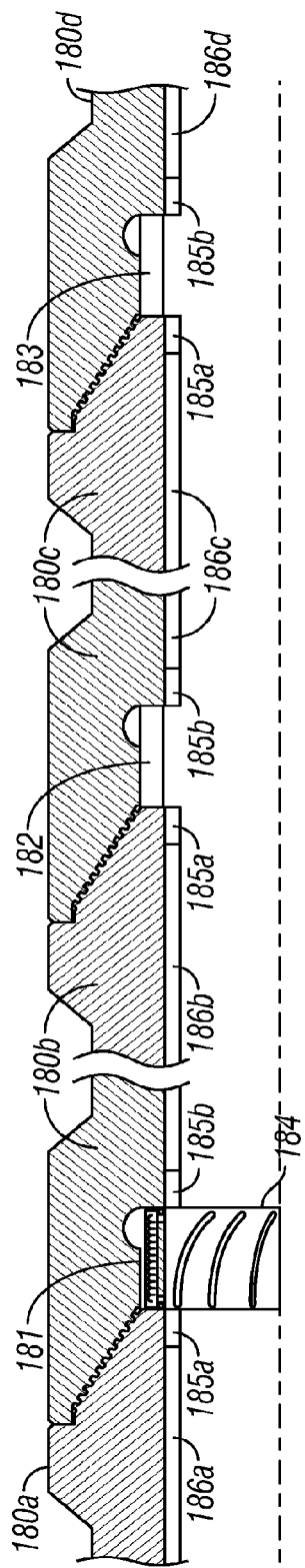
FIG. 18 is a schematic drawing of a micro turbine generator supplying power to multiple autonomous telemetry stations, according to an embodiment of the present invention.

Alternatively, in another embodiment, see FIG. 18, MTG 184 provides power to multiple telemetry stations, for example, ATS 181, 182, 183. The MTG as previously described, generates an alternating current (AC) voltage that may be inductively coupled to conductors (not shown) in sleeves 186a-d. As is known in the art, AC current flowing through a coil will produce a related time-varying magnetic field. Conversely, a time-varying magnetic field acting on a coil of wire will produce a time varying current in the coil. Two such coils may be positioned in appropriate proximity to transfer power from one coil to the other. The power transfer can be affected by various factors, including, but not limited to, the gap size, dielectric properties of intervening materials, coil turns, and coil diameter. The magnetic field may be shaped and/or enhanced through the use of various magnetic core materials such as ferrite. Such techniques are known in the art and are not discussed here in detail. Each sleeve 186a-d has an inductive coupler at each end 185a,b and transmits energy to and/or through each ATS 181-183. Each ATS may tap the AC voltage for internal conversion and use it to power each ATS and the sensors, as previously described, attached to each ATS. The raw voltage, as generated, may be inductively coupled along the conductors in sleeves 186a-d. Sleeves 186a-d may be any of the sleeves previously described, for example, in FIGS. 6-8B and 16A,B, or any other suitable sleeve and conductor combination. Alternatively, the voltage may be conditioned by circuitry (not shown, in ATS 181 to alter the voltage and/or frequency to enhance the inductive coupling efficiency. The actual spacing between adjacent MTG 184 units is application specific and depends on factors, including but not limited to, the types and power requirements of the sensors, the efficiency of the inductive coupling, and the losses in the conductors.

Figure 19:
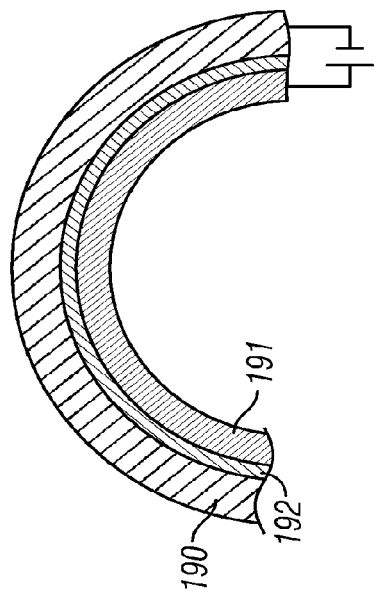
FIG. 19 is a schematic drawing of a galvanic power source utilizing the drill string section as a cathode, according to an embodiment of the present invention.

In one embodiment, another power source, see FIG. 19, comprises a sleeve 191 that extends substantially the length of a section of drill string 190. Sleeve 191 is a sacrificial anode separated from section 190 by a suitable electrolytic material 192, thereby establishing a galvanic cell running the length of sleeve 191. Such a cell may be designed to provide predetermined amounts of power using techniques known in the art. The voltage generated depends on the sleeve and drill pipe section materials, and the total current capacity is related to the conductivities of the sleeve 191 and gel 192 and the area of contact between the sleeve and the gel, which is related to the length of the sleeve. The sleeve may be installed using any of the techniques described previously, for example expanding such a sleeve 191 into contact with the section 190 while capturing the gel 192 in between. Suitable circuitry (not shown) may be embedded into the ends of such a sleeve 191 to convert the generated voltage to any suitable voltage required. In addition, such circuitry can be used to converted DC power to AC power for use in inductively coupling such power to adjacent sections of drill string.

Figure 20:
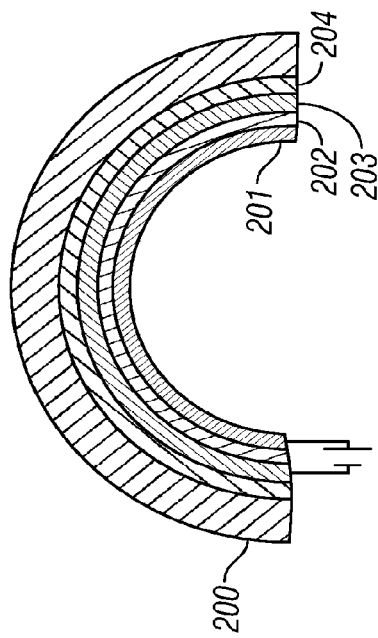
FIG. 20 is a schematic drawing of a galvanic cell having anode and cathode electrically insulated from the drill string section, according to an embodiment of the present invention.

In one embodiment, see FIG. 20, insulating sleeve 204 is inserted between drill section 200 and cathode 203. Electrolytic gel 202 is sandwiched between cathode 203 and anode 201 setting up a galvanic cell. The use of a separate cathode 203 insulated from the drill section 200 provides for more freedom in selecting the cell materials and cell voltage. The electrolytic gel of FIGS. 19 and 20 may be embedded or captured in a suitable open-cell mesh and/or honeycomb material (not shown) to prevent the gel from being extruded out from between the anode and cathode materials during installation and operation.

Any of the battery configurations described previously may be configured, using techniques known in the art, to be rechargeable using appropriate materials. Any of the energy scavenging devices or the MTG may be used to recharge such a battery system. Such a battery would be able to at least provide power during non-drilling and/or non-flowing periods and be recharged once such activity resumed.

Figure 21:
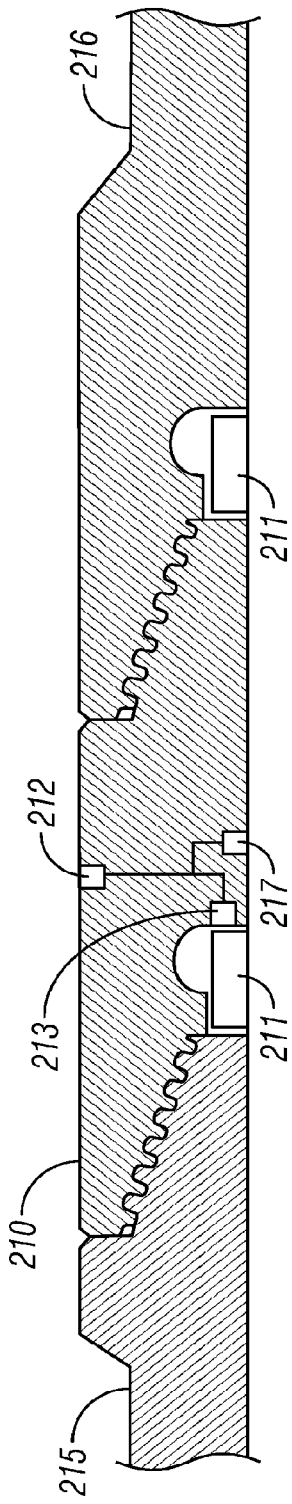
FIG. 21 is a schematic drawing of an instrumented sub inserted in a drill string, according to an embodiment of the present invention.
Figure 23:
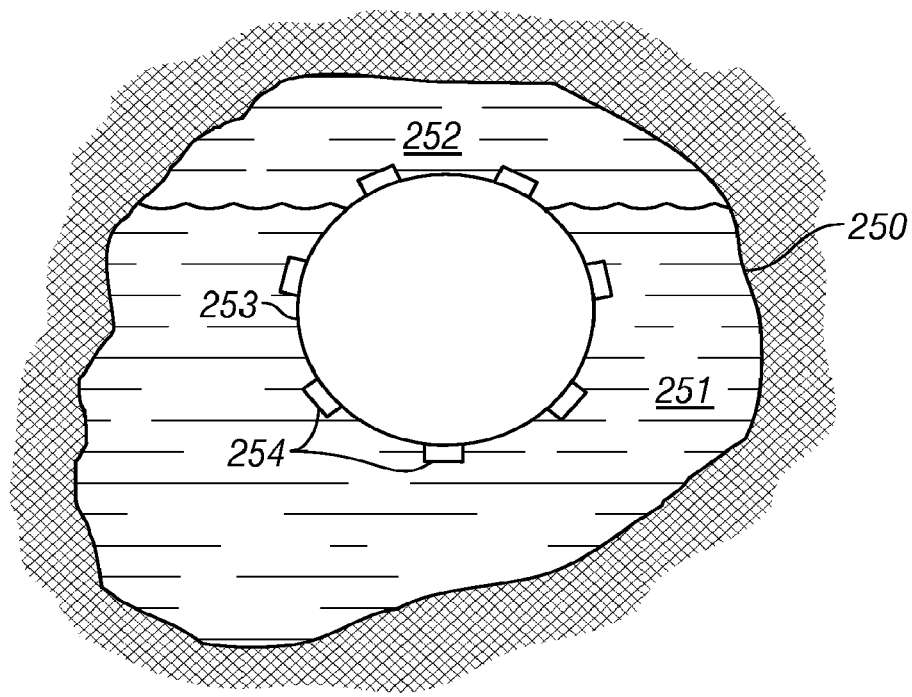
FIG. 23 is a schematic drawing showing a system for detecting multi-phase flow in a wellbore, according to an embodiment of the present invention.

In one embodiment, see FIG. 21, an instrumented sub 210, or pup joint, is installed in the drill string between sections 215 and 216. Sub 210 has, for example, sensors 212 and 217 mounted on an outer and inner diameter, respectively. Although shown in FIG. 21 as single sensors 213 and 217, multiple sensors may be mounted on the inside and/or outside diameters of sub 210. These sensors include, but are not limited to, (i) pressure sensors, (ii) temperature sensors, (iii) strain sensors, (iv) chemical species sensors, (v) fluid resistivity sensors, and (vi) fluid flow sensors. Sensors 212 and 217 may be powered by ATS 211 and interfaced through electronics module 213 attached to sub 210. Electronics module 213 may communicate to adjacent ATS 211, in either direction, using any of the previously discussed communication techniques. Multiple subs 210 may be inserted in the drill string at predetermined locations. The locations are application specific and may depend on factors such as the desired measurement and spatial resolution along the length of the drill string. In addition, sub 210 may have a transceiver (not shown) located on an outer diameter for communicating with and/or interrogating sensors or other devices mounted on production tubulars, and or production hardware. In addition, such an external transceiver may be used to communicate with and/or interrogate devices in lateral branches of multilateral wells in both the drilling and production environments. In one example, see FIG. 23, sub 253 is disposed in a drill string (not shown) in a substantially horizontal wellbore 250 and has multiple sensors 254 attached to an outer diameter of the sub 253. Drilling fluid 251 and influx fluid 252 are flowing past sub 253 forming a combined multi-phase fluid, where multi-phase refers to at least one of (i) an oil-drilling fluid mixture, (ii) a drilling fluid-gas mixture, and (iii) a drilling fluid-oil-gas mixture. The effects of gravity tend to cause the separation of the fluids into fluids 251 and 252. Fluid 252 may be a gas, water, oil, or some combination of these. Sensors 254, for example, may measure the resistivity of the fluid passing in close proximity to each sensor 254, thereby providing a cross-sectional profile related to the fluid makeup near each sensor. These measurements are communicated to the surface using the techniques of the present invention. Changes in the profile may be used to detect changes in the amount and composition of the fluid influx passing a measurement station along the wellbore. Such measurements may be used, for example, to monitor the placement of specialty drilling fluids and/or chemicals, commonly called pills, at a desired location in the wellbore. In addition, multiple cross sectional profiles may be measured and compared to determine the changes in the profiles along the wellbore.

As described previously, optical fibers may be incorporated in the sleeves described in FIGS. 6-8 and the tubes described in 16A,B for communicating between automated telemetry stations. The use of optical fibers can provide high bandwidth at relatively low signal loss along the fiber. Major impediments to the use of optical fibers in such an application include making optical connections at each ATS and the losses associated with optical connectors. As one skilled in the art will appreciate, it is not operationally feasible to ensure alignment of the fibers when the separate tubular members are threaded together as indicated in FIG. 22C. Shown in FIGS. 22A and B is one embodiment of a system to provide optical coupling to optical fibers that are not aligned and/or not in close enough proximity to allow direct coupling. Tubular sections 225a-b are joined at threaded connection 224. Optical fibers 223 and 222 are attached to an inside diameter of sections 225a and 225b, respectively, and form part of an optical communication channel. An ATS 220 is placed in the boreback area 230. ATS 220 contains sensors as previously described and an optical transceiver 233 for boosting the optical signal transmitted along the optical communication channel. The optical transceiver 233 comprises an optical coupler 231 for transferring the received optical signal to a optical receiver 226. The received optical signal is processed using circuitry 230 and a processor (not shown). Additional locally generated signals may be added to the received signal and the combined signal is retransmitted by optical transmitter 228 through transmitted optical coupler 232. The optical signal 234 is transmitted from the end of optical fiber 222 to optical coupler 231 through an optical coupling material (OCM) 221. OCM 221 may be an optically translucent material such that it transmits sufficient energy to be detected and at the same time diffuses the energy such that the optical fiber 222 and the optical coupler 231 may be rotationally misaligned similar to that shown for optical fibers in FIG. 22C. OCM 221 may be made translucent by doping the material with reflective materials. In one embodiment, OCM 221 is a translucent potting material having sufficient natural diffusion characteristics to provide acceptable light reception at optical receiver 226. For example, clear to translucent silicone potting materials are commercially available and are commonly used in potting electronic devices. ATS 220 may be encapsulated in the potting material in a shape approximating the boreback cavity 230 but slightly oversized such that when captured in connection 224 the optical fibers 222 and 223 are brought in intimate contact with OCM 221 providing optical coupling between optical fibers 222 and 223 and optical transceiver 233. Alternatively, any suitably transparent and/or translucent material may be used as OCM 221. In one embodiment, OCM 221 may be doped with a phosphorescent material such that signal light injected into OCM 221 causes the phosphorescent material to emit light within OCM 221 that may be detected by the optical receiver in transceiver 233. OCM 221 may be a viscous gel-like material that is swabbed into the box section of the connection 224 and has ATS 220 placed therein and captured by the makeup of the pin section of connection 224. Transceiver 233 may be powered by its own power source 229. Alternatively, transceiver 233 may be powered by any of the power systems previously described. In order to provide optical communications should transceiver 233 fail, optical fiber 236 provides a relatively low-loss redundant optical path for optical signal 234 to pass from optical fiber 222 to optical fiber 223. The attenuation in OCM 221 is typically substantially greater than through an optical fiber, such as fiber 236, and may not allow such a transmission through OCM 221 alone. The combined path has lower attenuation and provides at least some optical signal to reach fiber 223.

Figure 10A:
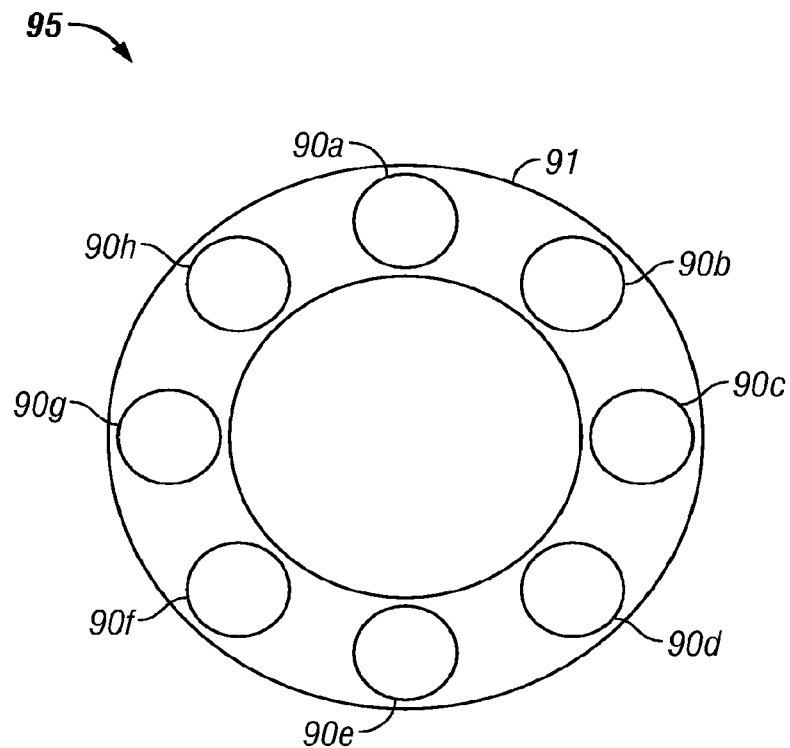
FIG. 10A,B are schematic drawings of an autonomous telemetry station having a plurality of telemetry modules therein, according to an embodiment of the present invention.
Figure 10B:

While only a single optical transceiver is described here, multiple optical transceivers may be annularly positioned in ATS 220, similar to the multiple acoustic transceivers described in FIGS. 10A,B. In one embodiment, each transceiver is adapted to receive and transmit the same frequency light signal. Again, a hierarchy may be established among such transceivers. Dispersion of the incoming signal in OCM 221 allows transceivers adjacent to a primary transceiver to detect the incoming signal and determine if the primary transceiver has transmitted the signal onward. Should the primary transceiver fail to transmit the signal, for example within in predetermined time period, one of the adjacent transceivers, according to the programmed hierarchy assumes the task and transmits the signal.

Alternatively, each of the multiple optical transceivers may receive and transmit a different light frequency. Such a system may provide for multiple redundant channels transmitting the same signal. Alternatively, each of multiple channels may communicate a different signal, at a different light wavelength, with selected channels having redundant transceivers.

Figure 22A:
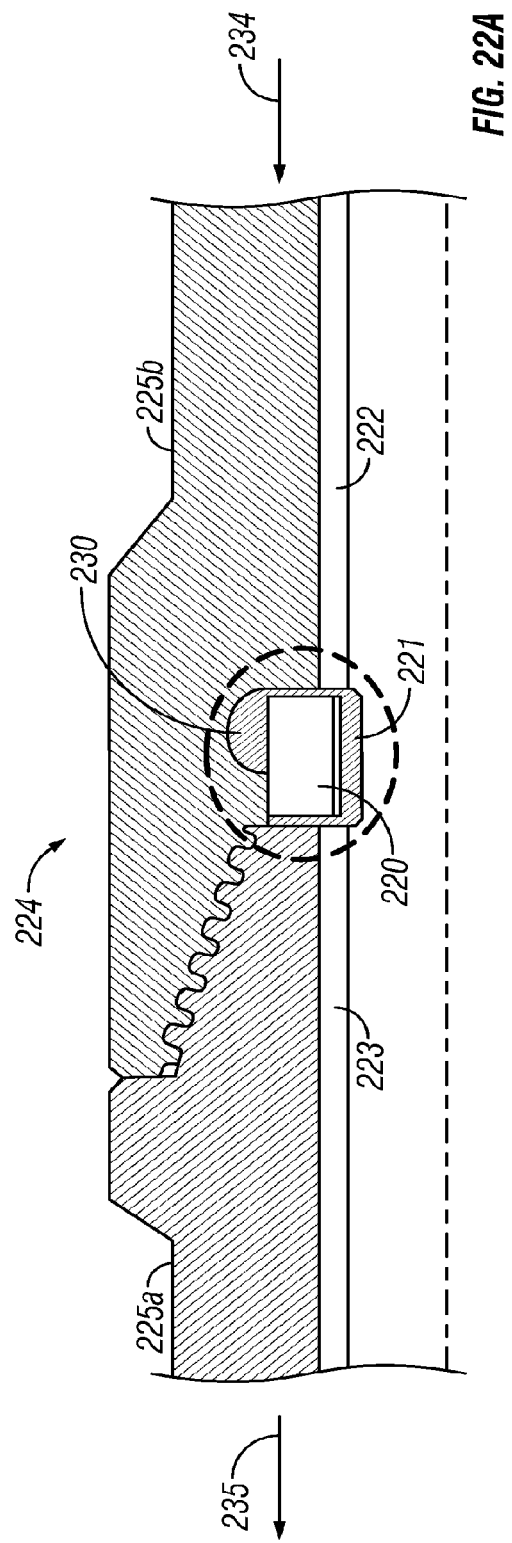
FIGS. 22A-C are schematic drawings of an optical communication system, according to an embodiment of the present invention.
Figure 22B:
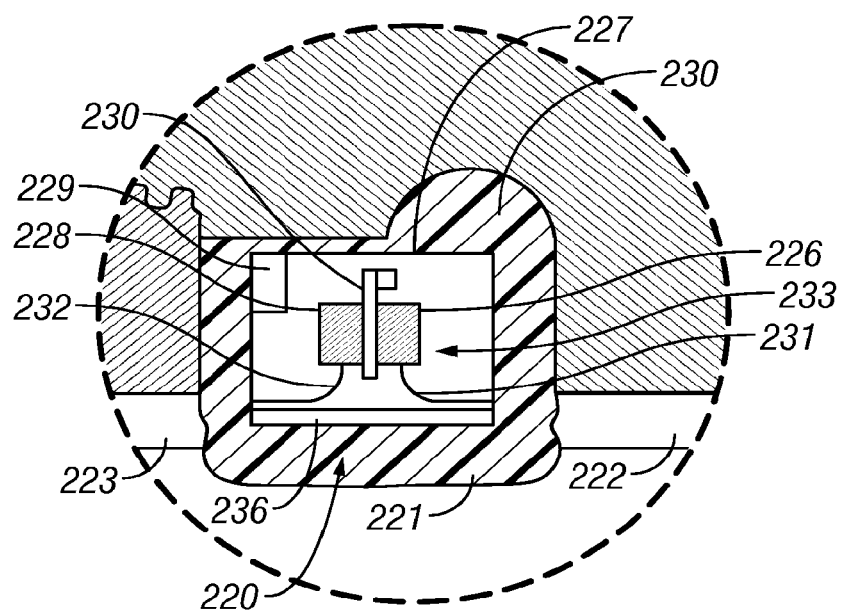
Figure 22C:
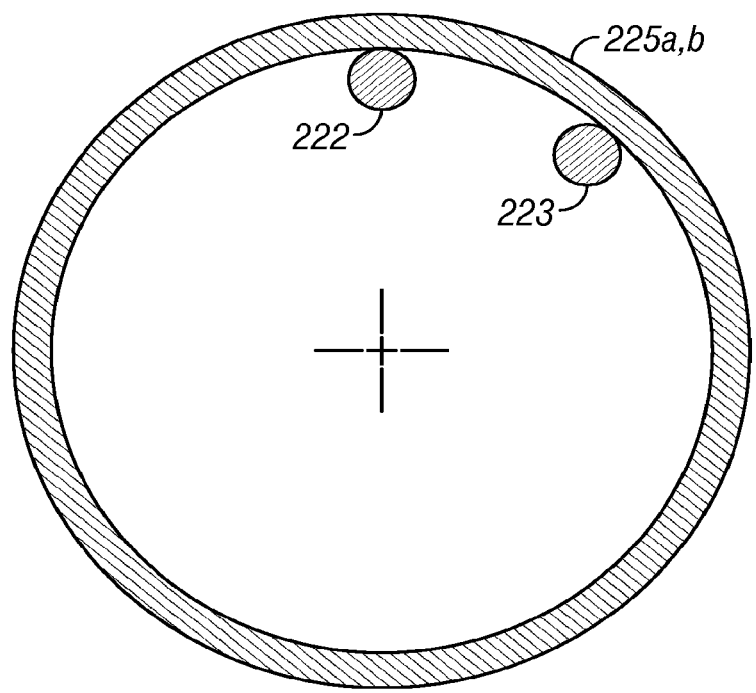

The description of FIGS. 22A,B refers to a unidirectional signal. It will be apparent to one skilled in the art, that bi-directional signals may be transmitted along the optical communication path by incorporating optical transceivers for transmitting in both directions. Such a system may include multiple optical fibers extending along each section with signals traveling in only a single direction in any one fiber. Alternatively, bi-directional signals may be transmitted over a single fiber using a number of techniques, including but not limited to, time division multiplexing and wave division multiplexing. It is intended that, for the purposes of this invention, any suitable multiplexing scheme known in the art may be used for bi-directional transmissions.

More than one physical transmission technique may be used to communicate information along the communication network as described herein. For example, an optical system may be used to transmit signals in an optical fiber disposed along a section of drill string. The signal at each end of the drill string section is transmitted to the next section using, for example, an RF transmission technique, as previously described. Any combination of techniques described may be used. Alternatively, multiple non-interfering physical transmission techniques may be used. For example, acoustic and RF, or RF and optical techniques may be both used to transmit information across a connection joint. The use of such multiple techniques will increase the probability of transmission across the connection joint. Any number of such non-interfering techniques may be used. Such combinations can be adapted to the particular field requirements by one skilled in the art without undue experimentation.

The distributed measurement and communication network, as disclosed herein, provides the ability to determine changing conditions along the length of the well in both the drilling and production operations. Several exemplary applications are described below. In a common drilling operation, sensor information may be available at the surface and near the bit, for example from Measurement While Drilling devices. Little, if any, information is available along the length of the drill string.

In a drilling operation, while tripping into and/or out of the hole, the drag on the drill string is typically measured only at the surface. In deviated wells, and especially horizontal wells, indications of distributed and/or localized drag on the drill string may be used to improve the tripping process and to identify locations of high drag that may require remedial action, such as reaming. In addition, the use of such real-time measurement data allows the tripping process to be substantially automated to ensure that the pull on any joint in the string does not exceed the maximum allowable load. In addition, distributed measurements of pressure along the string may be used to maintain the surge and swab pressures within acceptable limits. In addition, profiles of parameters such as, for example, strain, drag, and torque may be compared at different time intervals to detect time-dependent changes in drilling conditions along the wellbore.

In extended reach rotary drilling operations, variations in rotational friction along the length of the drill string may restrict the torque available at the bit. However, it is difficult to rectify such a problem without knowing where the increased drag exists. The distributed sensor system provides profiles of localized torque and vibration measurements (both axial and whirl) along the drill string enabling the operator to identify the problem locations and to take corrective action, such as installing a roller assembly in the drill string at a point of high drag. Such profiles may be compared at different time intervals to detect time-dependent changes, such as for example, build up of drill cuttings and other operating parameters.

In rotary drilling applications, the drill string has been shown to exhibit axial, lateral, and whirl dynamic instabilities that may damage the drill string and or downhole equipment and/or reduce the rate of penetration. The various vibrational modes along the drill string are complex and are not easily discernible from only end point (surface and bottomhole) measurements. Distributed vibrational and whirl measurements from the present invention are telemetered to the surface and processed by the surface controller to provide an enhanced picture of the dynamic movement of the drill string. The operator may then be directed, by suitable drilling dynamic software in the surface controller to modify drilling parameters to control the drill string vibration and whirl.

In another application, the drill string may become stuck in the wellbore during normal drilling operations, the strain and/or load measurements along the drill string allow the determination of the location where the drill string is stuck and allows the operator to take corrective actions known in the art.

In another embodiment, pressure and/or temperature measurements are made at the sensors distributed along the length of the drill string. Profiles of such measurements along the well length may be monitored and used to detect and control well influxes, also called kicks. As one skilled in the art will appreciate, as a gas influx rises in the wellbore, it expands as the local pressure is reduced to the normal pressure gradient of the drilling fluid in the annulus of the wellbore. If the surface well control valves are closed, a closed volume system is created. As the bubble rises, it expands and the pressure at the bottom of the wellbore increases causing a possible undesired fracturing along the open hole of the wellbore. By detecting the pressure in the annulus using the distributed sensors, the location of the bubble and the associated pressures along the wellbore can be determined allowing the operator to vent the surface pressure so as to prevent the bottomhole pressure from fracturing the formation.

As is known in the art, a wellbore may traverse multiple producing formations. The pressure and temperature profiles of the distributed measurements of the present invention may be used to control the equivalent circulating density (ECD) along the wellbore and prevent damage due to over pressure in the annulus near each of the formations. In addition, changes in the pressure and temperature profiles may be used to detect fluid inflows and outflows at the multiple formations along the wellbore. In another example, such distributed pressure and temperature measurements may be used to control an artificial lift pump placed downhole to maintain predetermined ECD at multiple formations. An example of such a pumping system is disclosed in published application U.S. 20030098181 A1, published May 29, 2003, and incorporated herein by reference.

In one embodiment, sensors such as those described in U.S. patent application Ser. No. 10/421475, filed on Apr. 23, 2003, assigned to the assignee of this application, and previously incorporated herein by reference, are attached to the outside of casing as it is run in the wellbore to monitor parameters related to the cementing of the casing in the wellbore. Such sensors may be self-contained with limited battery life for the typical duration of such an operation, on the order of 100 hours. The sensors may be adapted to acoustically transmit through the casing to autonomous telemetry stations mounted on a tubular string internal to the casing. Pressure and temperature sensors so distributed provide information related to the placement and curing of the cement in the annulus between the casing and the borehole.

It is intended that the techniques described herein, including the profile mapping, may be applied to any flowing system, including production wells, pipelines, injection wells and monitoring wells.

The foregoing description is directed to particular embodiments of the present invention for the purpose of illustration and explanation. It will be apparent, however, to one skilled in the art that many modifications and changes to the embodiment set forth above are possible. It is intended that the following claims be interpreted to embrace all such modifications and changes.

What is claimed is:

1. An apparatus for communicating data, comprising:
   a jointed tubular string having a first section and a second section connected at a connection joint, the tubular string having a fluid in an internal passage thereof;
   a first acoustic transducer mounted in the first section; and
   a second acoustic transducer mounted in the second section, wherein a signal transmitted from the first transducer to the second transducer is transmitted across the connection joint as an acoustic signal.

2. The apparatus of claim 1, wherein the first acoustic transducer is a transmitter and the second acoustic transducer is a receiver.

3. The apparatus of claim 2, wherein the first acoustic transducer is mounted proximate an end of the first section and the second acoustic transducer is mounted proximate an end of the second section.

4. The apparatus of claim 1, wherein the first acoustic transducer and the second acoustic transducer are configured to transmit and receive acoustic signals.

5. The apparatus of claim 1, wherein the acoustic signal is in the range from about 1 kHz to about 20 MHz.

6. The apparatus of claim 1 further comprising a controller configured to control at least one of the first and second acoustic transducers according to programmed instructions.

7. The apparatus of claim 1, wherein each transducer comprises:
   an electronic circuit configured to drive the transducer; and
   a power source configured to provide electric power to the circuit.

8. The apparatus of claim 7, wherein the power source is configured to generate power by using a downhole energy source.

9. The system of claim 8, wherein the downhole energy source is chosen from a group consisting of: (i) a fluid flowing in the tubular string; and (ii) motion of the tubular string.

10. The system of claim 7, wherein the power source is chosen from a group consisting of (i) a piezoelectric element, (ii) a turbine generator, (iii) a galvanic cell, (iv) a magneto-hydrodynamic generator, (v) an eccentric mass generator, (vi) a rolling ball generator, (vii) an electric battery, (viii) a thermoelectric generator, and (ix) a fuel cell.

11. The apparatus of claim 1, wherein each of the first and second transducers is mounted in an internal passage of its respective section.

12. A method for communicating data through a drill string, comprising:
   providing a jointed tubular string having a first section and a second section connected at a connection joint; and
   transmitting a signal from the first section to the second section across the connection joint as an acoustic signal from a first acoustic transducer placed in the first section to a second acoustic transducer placed in the second section.

13. The method of claim 12 further comprising:
   mounting the first acoustic transducer in an internal passage of the first section proximate the connection joint; and
   mounting the second acoustic transducer in an internal passage of the second section proximate the connection joint.

14. The method of claim 12, wherein each of the first and second acoustic transducers is a transceiver, each configured to transmit and receive acoustic signals.

15. The method of claim 14, wherein the acoustic signals are in the range from about 1 kHz to about 20 MHz.

16. The method of claim 14 further comprising providing each transducer with an electronic circuit that is configured to drive the transducer and a power source.

17. The method of claim 12 further providing a controller having a processor and a memory to control at least one of the first and second transducers according to programmed instructions.

18. The method of claim 12 further comprising selecting the power source to extract energy from a downhole potential energy source from a group consisting of: (i) a fluid flowing in said tubular string; and (ii) motion of the tubular string.

19. The method of claim 12 further comprising selecting the power source from a group consisting of: (i) a piezoelectric element; (ii) a micro turbine generator; (iii) a galvanic cell; (iv) a magneto-hydrodynamic generator; (v) an eccentric mass generator; (vi) a rolling ball generator; (vii) an electric battery; (viii) a thermoelectric generator; (ix) a fuel cell; (x) a turbine.

20. The method of claim 12 further comprising mounting each of the first transducer and the second transducer using a retaining ring in an internal passage of its respective sections.

* * * * *